(12) United States Patent
Yagihashi et al.

(10) Patent No.: US 11,530,046 B2
(45) Date of Patent: *Dec. 20, 2022

(54) AERIAL VEHICLE SAFETY APPARATUS AND AERIAL VEHICLE

(71) Applicant: NIPPON KAYAKU KABUSHIKI KAISHA, Chiyoda-ku (JP)

(72) Inventors: Yasuhiko Yagihashi, Himeji (JP); Hiroshi Nakamura, Himeji (JP); Koichi Sasamoto, Himeji (JP); Dairi Kubo, Himeji (JP); Takahiro Ooi, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 270 days.

This patent is subject to a terminal disclaimer.

(21) Appl. No.: 16/640,432

(22) PCT Filed: Jun. 19, 2018

(86) PCT No.: PCT/JP2018/023358
§ 371 (c)(1),
(2) Date: Feb. 20, 2020

(87) PCT Pub. No.: WO2019/039062
PCT Pub. Date: Feb. 28, 2019

(65) Prior Publication Data
US 2020/0198790 A1    Jun. 25, 2020

(30) Foreign Application Priority Data

Aug. 24, 2017 (JP) .............................. JP2017-161388
Feb. 8, 2018 (JP) .............................. JP2018-021311

(51) Int. Cl.
*B64D 17/72* (2006.01)
*B64D 17/80* (2006.01)
(Continued)

(52) U.S. Cl.
CPC .......... *B64D 17/725* (2013.01); *B64C 39/024* (2013.01); *B64D 17/025* (2013.01);
(Continued)

(58) Field of Classification Search
CPC ..... B64D 17/025; B64D 17/72; B64D 17/725
See application file for complete search history.

(56) References Cited

U.S. PATENT DOCUMENTS

| 1,189,112 A | 6/1916 | Howorth |
| 1,337,788 A | 4/1920 | Mott |

(Continued)

FOREIGN PATENT DOCUMENTS

| CN | 101267968 A | 9/2008 |
| CN | 101378809 A | 3/2009 |

(Continued)

OTHER PUBLICATIONS

Office Action dated Aug. 6, 2021 in co-pending U.S. Appl. No. 16/640,484, citing documents AA-AT therein, 14 pages.

(Continued)

*Primary Examiner* — Joseph W Sanderson
(74) *Attorney, Agent, or Firm* — Oblon, McClelland, Maier & Neustadt, L.L.P.

(57) ABSTRACT

An aerial vehicle safety apparatus includes a safety mechanism, a drive mechanism, an ejection mechanism, and a control mechanism. The safety mechanism is used for securing safety of at least one of an aerial vehicle and an object outside the aerial vehicle. The drive mechanism includes at least one drive unit serving as a drive source of the safety mechanism. The ejection mechanism ejects the drive mechanism together with the safety mechanism. The control mechanism controls operations of the drive mechanism for the drive mechanism to drive the safety mechanism after the ejection mechanism starts ejection of the safety mechanism.

15 Claims, 17 Drawing Sheets

(51) Int. Cl.
  *B64D 17/02* (2006.01)
  *B64C 39/02* (2006.01)
(52) U.S. Cl.
  CPC ........ *B64D 17/80* (2013.01); *B64C 2201/027*
           (2013.01); *B64C 2201/185* (2013.01)

(56) References Cited

U.S. PATENT DOCUMENTS

| | | |
|---|---|---|
| 1,840,618 A | 1/1932 | Castner |
| 1,861,784 A | 6/1932 | Brown et al. |
| 4,105,173 A | 8/1978 | Bucker |
| 5,244,169 A | 9/1993 | Brown et al. |
| 5,303,883 A | 4/1994 | Brewer et al. |
| 5,362,017 A | 11/1994 | Puckett |
| 5,992,794 A | 11/1999 | Rotman et al. |
| 6,565,042 B1 | 5/2003 | Yamada |
| 6,705,572 B1 | 3/2004 | Christopher |
| 8,403,268 B2 | 3/2013 | Suze et al. |
| 9,147,940 B2 | 9/2015 | Yahagi et al. |
| 9,613,539 B1 | 4/2017 | Lindskog et al. |
| 10,096,255 B1 | 10/2018 | Lindskog et al. |
| 10,427,781 B2 | 10/2019 | Sugaki et al. |
| 10,737,794 B2 | 8/2020 | Lee |
| 10,787,268 B2 | 9/2020 | Leidich et al. |
| 11,286,051 B2* | 3/2022 | Yagihashi .............. B64C 31/036 |
| 2003/0094544 A1 | 5/2003 | Yamada |
| 2009/0115175 A1 | 5/2009 | Nishimura et al. |
| 2009/0134277 A1 | 5/2009 | Kim et al. |
| 2010/0181421 A1 | 7/2010 | Albagli et al. |
| 2012/0049005 A1 | 3/2012 | Suh |
| 2014/0118178 A1 | 5/2014 | Yahagi et al. |
| 2015/0314881 A1 | 11/2015 | Tsaliah et al. |
| 2016/0221681 A1 | 8/2016 | Babovka et al. |
| 2016/0264248 A1 | 9/2016 | MacCallum et al. |
| 2017/0205536 A1* | 7/2017 | Musso .................... B63B 35/00 |
| 2017/0233086 A1 | 8/2017 | Homan et al. |
| 2017/0233087 A1 | 8/2017 | Homan et al. |
| 2017/0233088 A1 | 8/2017 | Homan et al. |
| 2017/0313433 A1 | 11/2017 | Ozaki |
| 2018/0111695 A1 | 4/2018 | Homan et al. |
| 2018/0134379 A1 | 5/2018 | Sugaki et al. |
| 2018/0244394 A1 | 8/2018 | Lee |
| 2020/0115049 A1 | 4/2020 | Nakamura et al. |
| 2020/0198790 A1 | 6/2020 | Yagihashi et al. |
| 2020/0216181 A1* | 7/2020 | Yagihashi .............. B64D 17/80 |
| 2020/0339278 A1 | 10/2020 | Nakamura et al. |
| 2022/0073209 A1* | 3/2022 | Shen ..................... B64D 17/76 |

FOREIGN PATENT DOCUMENTS

| | | |
|---|---|---|
| DE | 196 47 624 A1 | 6/1997 |
| EP | 0 129 026 A1 | 12/1984 |
| EP | 0 869 058 A2 | 10/1998 |
| EP | 3 050 805 A1 | 8/2016 |
| JP | 48-104300 | 12/1973 |
| JP | 50-14320 | 5/1975 |
| JP | 60-203598 A | 10/1985 |
| JP | 3-114497 U | 11/1991 |
| JP | 4-3898 U | 1/1992 |
| JP | 2001-120848 A | 5/2001 |
| JP | 2003-154020 A | 5/2003 |
| JP | 2005-323811 A | 11/2005 |
| JP | 2006-122374 A | 5/2006 |
| JP | 2007-83837 A | 4/2007 |
| JP | 2016-88111 A | 5/2016 |
| WO | WO 2013/008514 A1 | 1/2013 |
| WO | WO 2014/080409 A1 | 5/2014 |
| WO | WO 2016/171120 A1 | 10/2016 |

OTHER PUBLICATIONS

International Search Report dated Jul. 24, 2018 in PCT/JP2018/023359 (with English translation), citing documents AO through AS therein, 4 pages.
Extended European Search Report dated Apr. 29, 2021 in European Patent Appiication No. 18848766.4, citing documents AA through AD and AT therein, 7 pages.
Extended European Search Report dated Apr. 18, 2021 to European Patent Application No. 18848611.2, citing documents AO through AS, AU and AV therein, 8 pages.
International Search Report dated Jul. 17, 2018 in PCT/JP2018/023358 filed on Jun. 19, 2018, citing references AC and AO-AU therein, 2 pages.
Chinese Office Action dated Oct. 8, 2022, in Chinese Patent Application No. 201880054641.1, 19 pages.

* cited by examiner

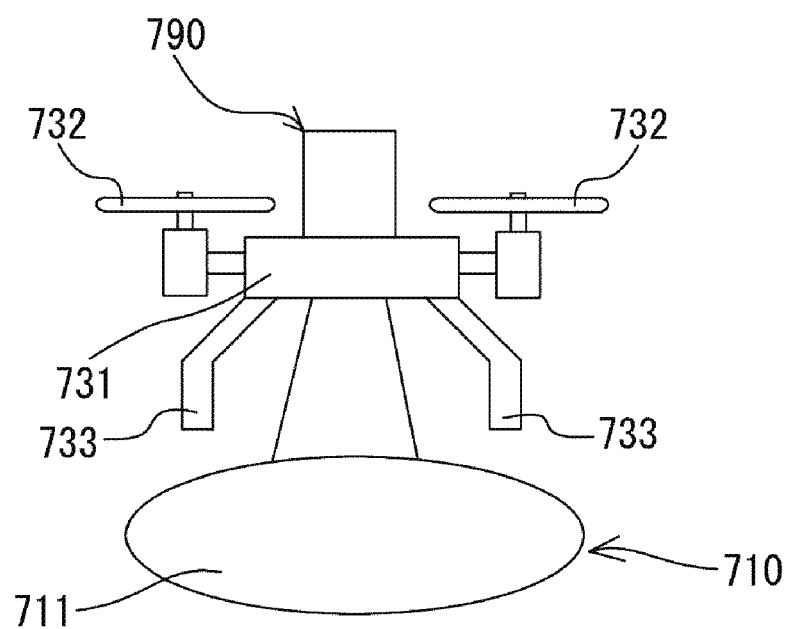

AERIAL VEHICLE SAFETY APPARATUS AND AERIAL VEHICLE

TECHNICAL FIELD

The present invention relates to an aerial vehicle represented, for example, by a drone and an aerial vehicle safety apparatus attached to the aerial vehicle.

BACKGROUND ART

Various aerial vehicles have conventionally been known. The aerial vehicle includes not only a manned aircraft such as a passenger aircraft or a helicopter but also an unmanned aircraft. In particular, with recent development of an autonomous control technology and a flight control technology, industrial applications of an unmanned aircraft such as a drone have increasingly been expanded.

A drone includes, for example, a plurality of rotors, and flies by rotating the plurality of rotors simultaneously in a balanced manner. At that time, ascent and descent are done by uniformly increasing or decreasing the number of rotations of the plurality of rotors, and movement forward and rearward is done by inclining an airframe by individually increasing or decreasing the number of rotations of each of the plurality of rotors. It is expected that such an unmanned aircraft will more increasingly be used worldwide in the future.

A falling accident of an unmanned aircraft, however, has been feared, which has interfered widespread use of the unmanned aircraft. In order to lower the possibility of such a falling accident, a parachute apparatus for an unmanned aircraft that serves as a safety apparatus has been put into practical use. Such a parachute apparatus for an unmanned aircraft lessens impact at the time of landing by lowering a speed of the unmanned aircraft by using an expanded parachute in the event of falling of the unmanned aircraft.

Japanese Patent Laying-Open No. 2003-154020 (PTL 1) discloses an emergency parachute apparatus in which a parachute thereof is higher in speed of expansion than a normal parachute apparatus such that the parachute apparatus can be used for escape of people from higher floors of a building in such disasters as earthquake or fire. The emergency parachute apparatus includes a parachute provided with a gas generator and the speed of expansion of the parachute is significantly increased by allowing gas generated by activation of the gas generator to flow into a space in the parachute.

CITATION LIST

Patent Literature

PTL 1: Japanese Patent Laying-Open No. 2003-154020

SUMMARY OF INVENTION

Technical Problem

If a parachute provided with a gas generator as disclosed in PTL 1 is applied to an aerial vehicle safety apparatus, the parachute would quickly be expanded. Therefore, such an application may be advantageous in that the parachute can be used also when an aerial vehicle flies at a relatively low altitude.

The parachute employed in the aerial vehicle safety apparatus, however, should reliably be expanded without being interfered by such a component as a propulsive mechanism or a leg of the aerial vehicle at the time of expansion, and the parachute disclosed in PTL 1 paying no attention to this aspect cannot be applied as it is to the aerial vehicle safety apparatus.

Such a problem similarly arises also in providing a paraglider instead of a parachute in an aerial vehicle safety apparatus or providing an air bag in an aerial vehicle. Furthermore, such a problem similarly arises in reliably effecting operations of a safety mechanism other than the parachute, the paraglider, or the air bag described above when such a safety mechanism is provided as being ejected from an aerial vehicle.

The present invention was made to solve the problems described above, and an object thereof is to provide an aerial vehicle safety apparatus capable of reliably effecting operations of a safety mechanism provided as being ejected from an aerial. vehicle and an aerial vehicle including the same.

Solution to Problem

An aerial vehicle safety apparatus based on the present invention is attachable to an aerial vehicle including a propulsive mechanism, and the aerial vehicle safety apparatus includes a safety mechanism, a drive mechanism, an ejection mechanism, and a control mechanism. The safety mechanism is used for securing safety of at least one of the aerial vehicle and an object outside the aerial vehicle. The drive mechanism includes at least one drive unit serving as a drive source of the safety mechanism. The ejection mechanism is capable of ejecting the drive mechanism together with the safety mechanism. The control mechanism controls operations of the drive mechanism far the drive mechanism to drive the safety mechanism after the ejection mechanism starts ejection of the safety mechanism.

In the aerial vehicle safety apparatus based on the present invention, the ejection mechanism and the control mechanism may simultaneously receive an activation signal. In that case, preferably, the drive unit includes an explosive type gas generator containing an igniter, and the igniter includes a combustion agent that burns by being ignited, an ignited portion that generates thermal energy that ignites the combustion agent, and a delay charge interposed between the combustion agent and the ignited portion, the delay charge conducting with a time lag, thermal energy generated by the ignited portion to the combustion agent. In this case, the control mechanism includes the delay charge.

In the aerial vehicle safety apparatus based on the present invention, the ejection mechanism and the control mechanism may simultaneously receive an activation signal. In that case, the control mechanism may include an activation delay mechanism that activates the drive mechanism after lapse of a prescribed time period since activation of the ejection mechanism.

In the aerial vehicle safety apparatus based on the present invention, the activation delay mechanism may include a mechanical timer apparatus that delays timing of activation of the drive unit by using a motor and a plurality of gears or an electric timer apparatus that delays timing of activation of the drive unit by using an IC timer.

In the aerial vehicle safety apparatus based on the present invention, the safety mechanism may include an expandable object that is wound or folded in a non-expanded state, the safety mechanism being capable of generating at least one of lift and buoyancy in an expanded state. The ejection mechanism may include an ejection apparatus coupled to the expandable object with a coupling member being interposed, the ejection apparatus being configured to eject the non-expanded expandable object into air. In that case, the drive mechanism preferably includes an expansion mechanism provided in the expandable object, the expansion mechanism being configured to expand the expandable object.

The expandable object herein is capable of generating at least one of lift and buoyancy in an expanded state as described above and it suitably includes a parachute or a paraglider.

Many parachutes have a fabric in a shape of an umbrella, and the parachute is connected to an aerial vehicle to be protected through a coupling member (which is generally referred to as a cord or a line) and lowers a speed of the aerial vehicle by using air resistance. Examples of the parachute include a parachute including a single chute, a parachute including a string of chutes identical in shape, and a parachute including a string of chutes different in shape. Examples of the parachute further include a parachute including a chute having a closed center (that is, without a hole) and a parachute including a chute provided with a hole called a spill hole in the center. A specific form of the parachute can be selected as appropriate in consideration of various purposes such as mitigation of impact at the time of expansion of the parachute, adjustment of a rate of descent, or resistance against influence by disturbance such as wind.

A paraglider is in a shape like a wing having an aspect ratio approximately not lower than one, and it is connected to an aerial vehicle to be protected through a coupling member (which is generally referred to as a cord or a line). The paraglider has a steering cord called a brake cord connected to left and right ends of the wing. By pulling the brake cord, various stresses applied to a cross-section of the wing can be varied and consequently, gliding, turning, and rapid deceleration can be done. Therefore, the paraglider can do gliding, turning, and rapid deceleration which cannot be done by a parachute. A Rogallo paraglider and a triangular paraglider are also available as similarly constructed paragliders. In order to maintain the shape of the wing by using ram air, a paraglider with an air intake (an air inlet which will be described later) is in the mainstream, however, there is a paraglider without an air intake. In order to fly in a stable manner, a paraglider with an air intake is more preferably used. From a point of view of reduction in weight, a single surface paraglider (that is, a paraglider without an air intake) is preferably used. Furthermore, a paraglider of a type capable of flying by forcibly obtaining propelling force by separately providing a propulsive apparatus such as a propeller may be used.

In the aerial vehicle safety apparatus based on the present invention, the ejection apparatus may include a first ejector and a second ejector. In that case, the first ejector may eject the expandable object and the second ejector into air, and the second ejector may eject the expandable object into air after the second ejector is ejected by the first ejector.

In the aerial vehicle safety apparatus based on the present invention, the ejection apparatus may include a first ejector and a second ejector. In that case, the first ejector may eject into air, a drogue chute for drawing out the expandable object and the second ejector may eject the expandable object into air after the first ejector ejects the drogue chute.

In the aerial vehicle safety apparatus based on the present invention, the expansion mechanism may include a bag-shaped member provided in the expandable object and a gas generator as the drive unit provided in the expandable object. In that case, preferably, the bag-shaped member includes a member that is wound or folded together with or separately from the non-expanded expandable object and expands the non-expanded expandable object by at least partially being inflated like a tube, and preferably, the gas generator inflates the bag-shaped member by causing gas generated at the time of activation to flow into the bag-shaped member.

In the aerial vehicle safety apparatus based on the present invention, the bag-shaped member may include a plurality of tubular portions formed radially or in grids.

In the aerial vehicle safety apparatus based on the present invention, the expandable object may have a two-dimensionally elongated shape in an expanded state. In that case, preferably, the bag-shaped member is disposed to extend along a longitudinal direction of the expanded expandable object. The expandable object having the two-dimensionally elongated shape in the expanded state normally includes a paraglider.

In the aerial vehicle safety apparatus based on the present invention, the expandable object may include a wing-shaped member containing a plurality of air chambers and a plurality of air inlets provided in a front portion so as to correspond to respective ones of the plurality of air chambers. In that case, preferably, the bag-shaped member is disposed inside or outside the expandable object to extend along the vicinity of a portion of the expandable object where the plurality of air inlets are provided. The expandable object containing a plurality of air chambers normally includes a paraglider with an air intake.

In the aerial vehicle safety apparatus based on the present invention, the gas generator may be of an explosive type containing an igniter. In that case, preferably, the igniter includes a combustion agent that burns by being ignited, an ignited portion that generates thermal energy that ignites the combustion agent, and a delay charge interposed between the combustion agent and the ignited portion, the delay charge conducting, with a time lag, thermal energy generated by the ignited portion to the combustion agent. In this case, the control mechanism includes the delay charge.

In the aerial vehicle safety apparatus based on the present invention, the gas generator may be of an explosive type containing an igniter. In that case, the control mechanism may include an activation delay mechanism that activates the gas generator after lapse of a prescribed time period since activation of the ejection apparatus.

The aerial vehicle safety apparatus based on the present invention may further include an electric circuit that supplies electric power for activating the gas generator. In that case, the electric circuit preferably includes a power supply and a switch that switches on and off the power supply. In this case, the activation delay mechanism includes the electric circuit and a switch controller that switches operations of the switch.

In the aerial vehicle safety apparatus based on the present invention, preferably, the switch includes a positive electrode plate, a negative electrode plate opposed to the positive electrode plate, and an insulator removably interposed between the positive electrode plate and the negative electrode plate, and the switch controller includes a string member having one end coupled to the insulator and the other end coupled to the ejection apparatus or the aerial vehicle. In this case, the power supply is switched from off to on as the ejection apparatus ejects the expandable object, the string member pulls the insulator to pull out the insulator from between the positive electrode plate and the negative electrode plate, and the positive electrode plate and the negative electrode plate come in contact with each other.

In the aerial vehicle safety apparatus based on the present invention, a length between the one end of the string member coupled to the insulator and the other end of the string member coupled to the ejection apparatus or the aerial vehicle is preferably variably adjustable.

In the aerial vehicle safety apparatus based on the present invention, the safety mechanism may include an air bag as an expandable object that is wound or folded in a non-expanded state and serves as a cushion in an expanded state and the ejection mechanism may include an ejection apparatus that is coupled to the air bag with a coupling member being interposed and ejects the non-expanded air bag into air. In that case, preferably, the drive mechanism includes an expansion mechanism that is provided in the air bag and expands the air bag.

In the aerial vehicle safety apparatus based on the present invention, the expansion mechanism may include a bag-shaped member provided in the air bag and a gas generator as the drive unit provided in the air bag. In that case, the bag-shaped member may include a member that is wound or folded together with or separately from the non-expanded air bag and expands the non-expanded air bag by at least partially being inflated like a tube. In this case, preferably, the gas generator may inflate the bag-shaped member by causing gas generated at the time of activation to flow into the bag-shaped member.

An aerial vehicle based on the present invention includes an airframe, a propulsive mechanism that is provided in the airframe and propels the airframe, and the aerial vehicle safety apparatus based on the present invention described above, and the aerial vehicle safety apparatus is attached to the airframe.

In the aerial vehicle based on the present invention, the ejection apparatus may include a container that includes an opening on a side of one end and accommodates the expandable object, a moving member movably provided along an inner wall surface of the container, and an ejection drive unit that moves the moving member toward the opening. In that case, preferably, the moving member includes on a side of the opening, a carrier that carries the expandable object. In this case, the opening is preferably disposed at a position higher than the propulsive mechanism in a direction of height in which the moving member moves.

In the aerial vehicle based on the present invention, the airframe may be provided with a leg. In that case, the aerial vehicle safety apparatus may be located adjacently to the leg.

Advantageous Effects of Invention

According to the present invention, an aerial vehicle safety apparatus capable of reliably effecting operations of a safety mechanism provided as being ejected from an aerial vehicle and an aerial vehicle including the same can be provided.

BRIEF DESCRIPTION OF DRAWINGS

FIG. 17 is a schematic front view showing a state of an aerial vehicle including an aerial vehicle safety apparatus according to a fourth modification after an air bag is expanded.

DESCRIPTION OF EMBODIMENTS

Embodiments of the present invention will be described in detail below with reference to the drawings. The embodiments and modifications thereof shown below illustrate application of the present invention to a drone representing an unmanned aircraft as an aerial vehicle.

First Embodiment

An aerial vehicle safety apparatus provided with a paraglider as an expandable object and an aerial vehicle including the same will initially be described as a first embodiment.

Figure 1:
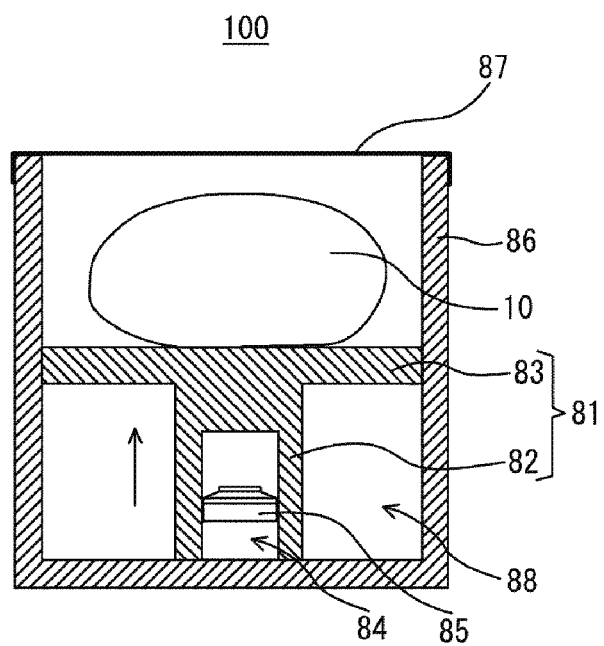
FIG. 1 is a schematic cross-sectional view of an aerial vehicle safety apparatus according to a first embodiment.

FIG. 1 is a schematic cross-sectional view of an aerial vehicle safety apparatus 100 according to the first embodiment. As shown in FIG. 1, aerial vehicle safety apparatus 100 according to the present embodiment includes an actuator 88 as an ejection apparatus (ejection mechanism) and a paraglider 10 as an expandable object (safety mechanism). Actuator 88 includes an igniter 84 as an ejection drive unit including a cup-shaped case 85 that accommodates an ignition agent (not shown), a piston 81 as a moving member including a recess 82 and a piston head 83 as a carrier formed integrally with recess 82, and a housing 86 as a cylindrical container with bottom that accommodates piston 81 and restricts a direction of propulsion of piston 81.

Paraglider 10 is stored in housing 86 in a non-expanded state as being arranged on piston head 83. By propelling piston 81 in such a construction, paraglider 10 can directly be driven out and expanded. An opening end where an opening of housing 86 is provided is closed by a lid 87 in an initial state, and lid 87 is removed from the opening end as paraglider 10 is driven out.

When an abnormal condition is detected by an abnormality detector (not shown) such as an acceleration sensor, piston 81 is propelled by a gas pressure generated based on an ignition operation by an igniter 84. Paraglider 10 is thus directly driven out by propelling power of piston 81. Though not shown, paraglider 10 is connected to housing 86 by a coupling member (line), and the paraglider is constructed so as to suspend an aerial vehicle 30 which will be described later through the coupling member (line) after the paraglider is expanded.

Figure 2:
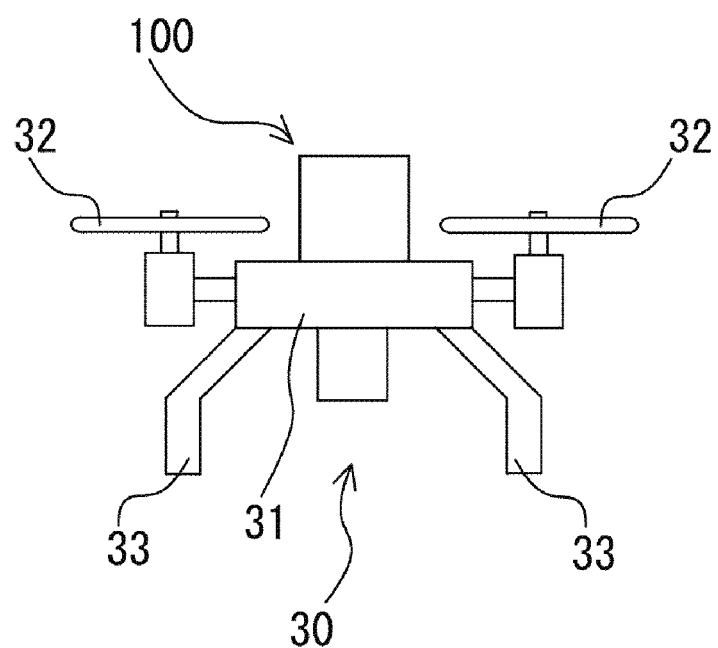
FIG. 2 is a schematic front view of an aerial vehicle including the aerial vehicle safety apparatus shown in FIG. 1.

FIG. 2 illustrates aerial vehicle 30 including aerial vehicle safety apparatus 100. Aerial vehicle 30 includes an airframe 31, aerial vehicle safety apparatus 100 attached to airframe 31, at least one propulsive mechanism (for example, a propeller) 32 provided in airframe 31 and propelling airframe 31, and a plurality of legs 33 provided under airframe 31.

Figure 3:
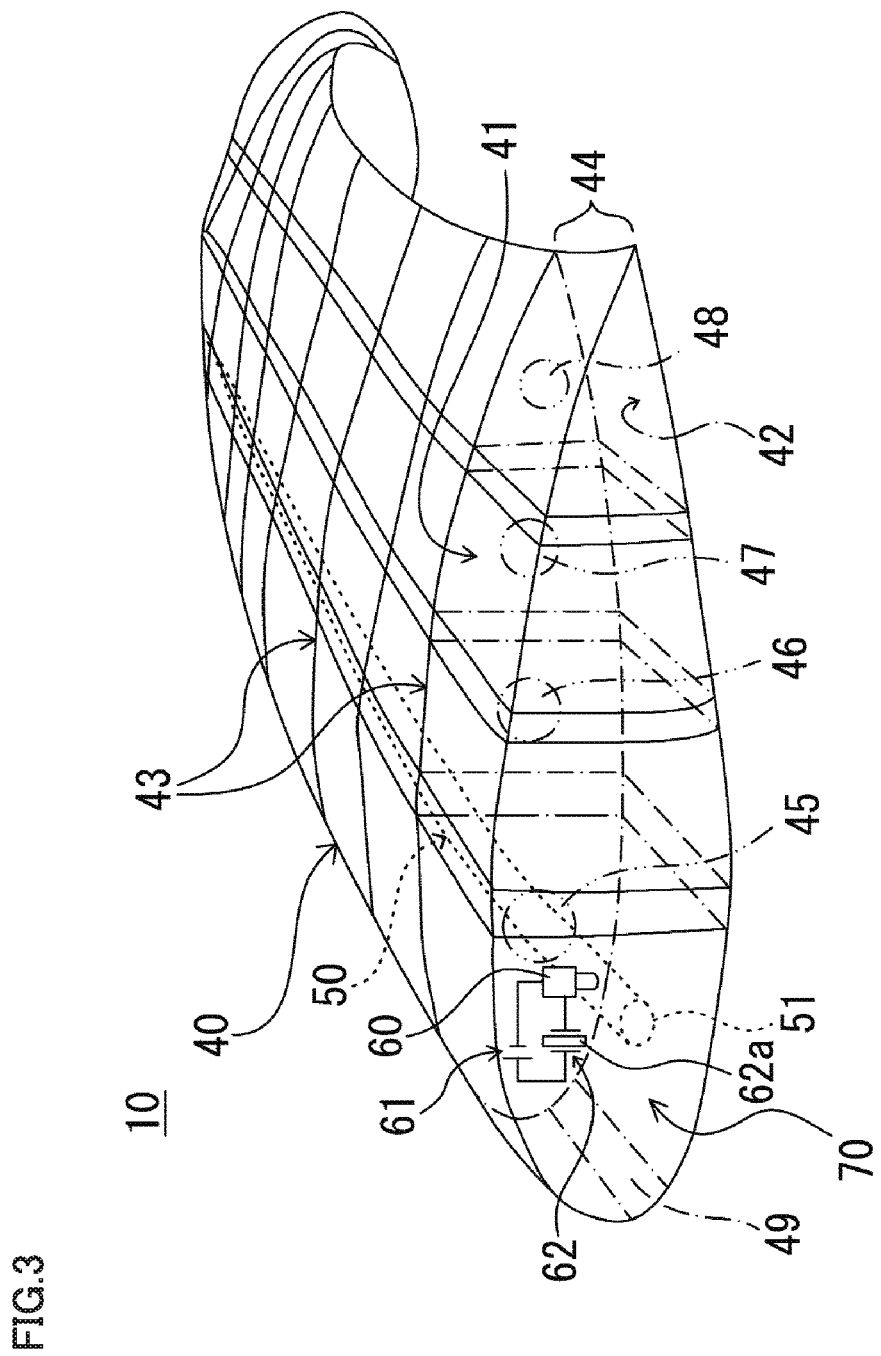
FIG. 3 is a schematic diagram showing a state after a paraglider shown in FIG. 1 is expanded.

FIG. 3 illustrates expanded paraglider 10. Paraglider 10 includes a canopy (a wing-shaped member) 40 and canopy 40 includes an upper cloth 41, a lower cloth 42, a rib 43, and a side cloth 70. A reinforced cloth made of chemical fibers such as nylon or polyester is used for upper cloth 41, lower cloth 42, rib 43, and side cloth 70.

Figure 4:
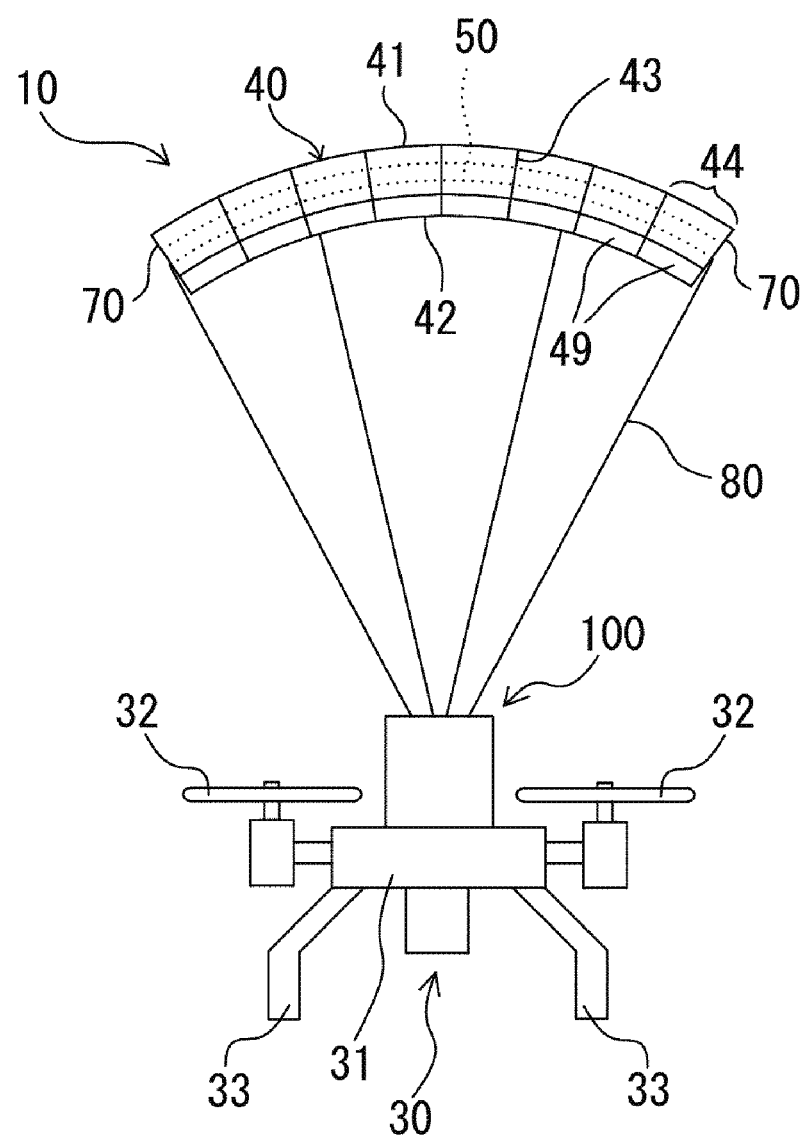
FIG. 4 is a schematic front view showing a state of the aerial vehicle shown in FIG. 2 after the paraglider is expanded.

FIG. 4 illustrates aerial vehicle 30 after paraglider 10 is expanded. Upper cloth 41 and lower cloth 42 have outer edges joined by sewing such that a prescribed space is provided among the upper cloth, the lower cloth, and side cloth 70 on opposing sides thereof. As shown in FIGS. 3 and 4, a plurality of ribs 43 are provided at prescribed intervals between upper cloth 41 and lower cloth 42 so as to define a plurality of cells (air chambers) 44 by vertically partitioning the prescribed space between upper cloth 41 and lower cloth 42. Each of cells 44 is filled with air when canopy 40 is expanded to hold a wing shape thereof.

Ribs 43 are provided with inner air flow holes 45, 46, 47, and 48, and air in cell 44 can laterally move in canopy 40 through inner air flow holes 45, 46, 47, and 48. An air intake (air inlet) 49 is provided in a front portion (front edge) of each cell 44 so that air can be taken into each cell 44. FIG. 3 illustrates only the inside of cell 44 on a front side on the sheet plane as being seen through.

An elongated bag-shaped member 50 which is foldable or can be wound is inserted in inner air flow hole 45. Being foldable here encompasses, for example, being foldable like bellows and being foldable as being layered by being folded back a plurality of times. Bag-shaped member 50 has one end 51 (the front side on the sheet plane in FIG. 3) joined by sewing to side cloth 70 on the front side on the sheet plane in FIG. 3, so that air is less likely to escape. Bag-shaped member 50 is provided as extending along an inner side of upper cloth 41 from a portion of insertion into inner air flow hole 45 toward the other end of canopy 40 (on a rear side on the sheet plane in. FIG. 3) (further preferably, joined by sewing to upper cloth 41 or lower cloth 42).

A reinforced cloth similar to that for upper cloth 41 can be employed for bag-shaped member 50, and in particular, a cloth made of a material resistant to heat or a cloth having an inner surface coated with a heat resistant coating is preferably employed in order to protect the cloth against heat of gas generated by a gas generator 60. Since bag-shaped member 50 should withstand sudden inflation resulting from flow-in of gas, it preferably has strength sufficient to withstand a generated gas pressure.

Specifically, for example, nylon 6, nylon 66, nylon 12, nylon 46, nylon 56, nylon 610, copolymerized polyamide of nylon 6 and nylon 66, copolymerized polyamide resulting from copolymerization of polyalkylene glycol, dicarboxylic acid, and amine with nylon 6, a polyester-based resin such as polyethylene terephthalate, polybutylene terephthalate, or polytrimethylene terephthalate, a polyacrylic resin, or a polyolefin-based resin such as polypropylene can be used for a fabric of bag-shaped member 50. Among these, polyamide 66 excellent in resistance against impact and heat can particularly suitably be used for a fabric of bag-shaped member 50.

For example, various resins such as a silicone-based resin, a polyurethane-based resin, a polyacrylic resin, a polyamide-based resin, a polyester-based resin, a polyolefin-based resin, or a fluoric resin and various types of rubber such as silicone-based rubber, chloroprene-based rubber, or chlorosulfonated polyethylene-based rubber can be used for a coating layer provided to the fabric of bag-shaped member 50 for providing heat resistance, and the silicone-based resin is particularly preferably used. By using the silicone-based resin, not only heat resistance but also cold resistance, flame retardancy, and an air cut-off property can be enhanced. A dimethyl silicone resin, a methyl vinyl silicone resin, a methyl phenyl silicone resin, or a fluorosilicone resin is available as such a silicone-based resin. The coating layer preferably further contains a flame-retardant compound. Examples of such a flame retardant compound include a halogen compound containing bromine or chlorine (in particular, halogenated cycloalkane), a platinum compound, antimony oxide, copper oxide, titanium oxide, a phosphorus compound, a thiourea-based compound, carbon, cerium, and silicon oxide, and in particular, a halogen compound, a platinum compound, copper oxide, titanium oxide, or carbon is more preferably used. An appropriate coating layer is preferably selected in accordance with a material for a yarn for making a fabric, and a material securely in intimate contact with warps and wefts is preferred. For example, when yarns are polyamide yarns or polyester yarns, the coating layer is preferably composed of a polyurethane-based resin or a polyacrylic resin.

The other end of bag-shaped member 50 may be provided with a hole (not shown) through which excessive air can be discharged to the outside of canopy 40 for regulating an internal pressure in bag-shaped member 50. A bag-shaped member in a tubular shape (a shape like a pipe or a cylinder) containing an internal space when it is inflated by gas which flows thereinto is preferably used as bag-shaped member 50.

In cell 44 on the front side on the sheet plane in FIG. 3, gas generator 60 capable of emitting gas into bag-shaped member 50 and increasing a pressure in bag-shaped member 50 is provided between one end of bag-shaped member 50 and the portion of insertion of bag-shaped member 50 into inner air flow hole 45.

Gas generator 60 contains an igniter and it is of an explosive type further including an enhancer agent, a gas generating agent, and a filter as necessary. An electric circuit in which a power supply 61 and a switch 62 are connected in series is connected to gas generator 60. This electric circuit is provided inside cell 44 on the front side on the sheet plane in FIG. 3.

Switch 62 includes a positive electrode plate and a negative electrode plate, with an insulator 62a lying between the positive electrode plate and the negative electrode plate. Insulator 62a is coupled to airframe 31, leg 33, aerial vehicle safety apparatus 100, or an injector by a string member (not shown) as a switch controller. Insulator 62a is thus constructed to be pulled out from between the positive electrode plate and the negative electrode plate of switch 62 when paraglider 10 is ejected and tension is produced in the string member.

Therefore, as insulator 62a is pulled out, the positive electrode plate and the negative electrode plate described above are in contact with each other, switch 62 is turned on, and a current flows from the power supply to the electric circuit, so that the igniter is ignited and gas generator 60 is activated. The string member described above is variable in length, so that timing of conduction of a current to the igniter can be adjusted as appropriate.

In one modification, gas generator 60 may communicatively be connected to an external controller. In that case, instead of the string member, an on and off switch for the power supply is controlled by an electrical signal transmitted from the controller. Alternatively, the power supply may be turned on after lapse of an arbitrary time period by using an integrated circuit (IC) timer representing an electric timer apparatus or a motor and a plurality of gears representing a mechanical timer apparatus.

Timing of activation of gas generator 60 may be adjusted by providing a delay charge (an agent that delays ignition of an ignited agent for a prescribed time period) between an ignited agent (combustion agent) in the igniter in gas generator 60 and an ignited portion or by electrically causing delayed ignition (intended delayed ignition). Specific examples of the ignited portion include a component including a resistor that converts transmitted electric energy into thermal energy (for example, a bridge wire made of a Nichrome wire) and a current conduction terminal for conducing electricity to the resistor, although it is not shown.

In another modification of gas generator 60, a hybrid type or stored type gas generator in which a sealing plate in a small gas canister is cleaved by an explosive igniter to emit gas in the inside to the outside may be employed. In this case, incombustible gas such as argon, helium, nitrogen, or carbon dioxide or a mixture thereof can be employed as compressed gas in the gas canister. In order to reliably inflate the bag-shaped member at the time of emission of compressed gas, a heat generator composed of a gas generating composition or a thermite composition may be provided in the gas generator.

Figure 5:
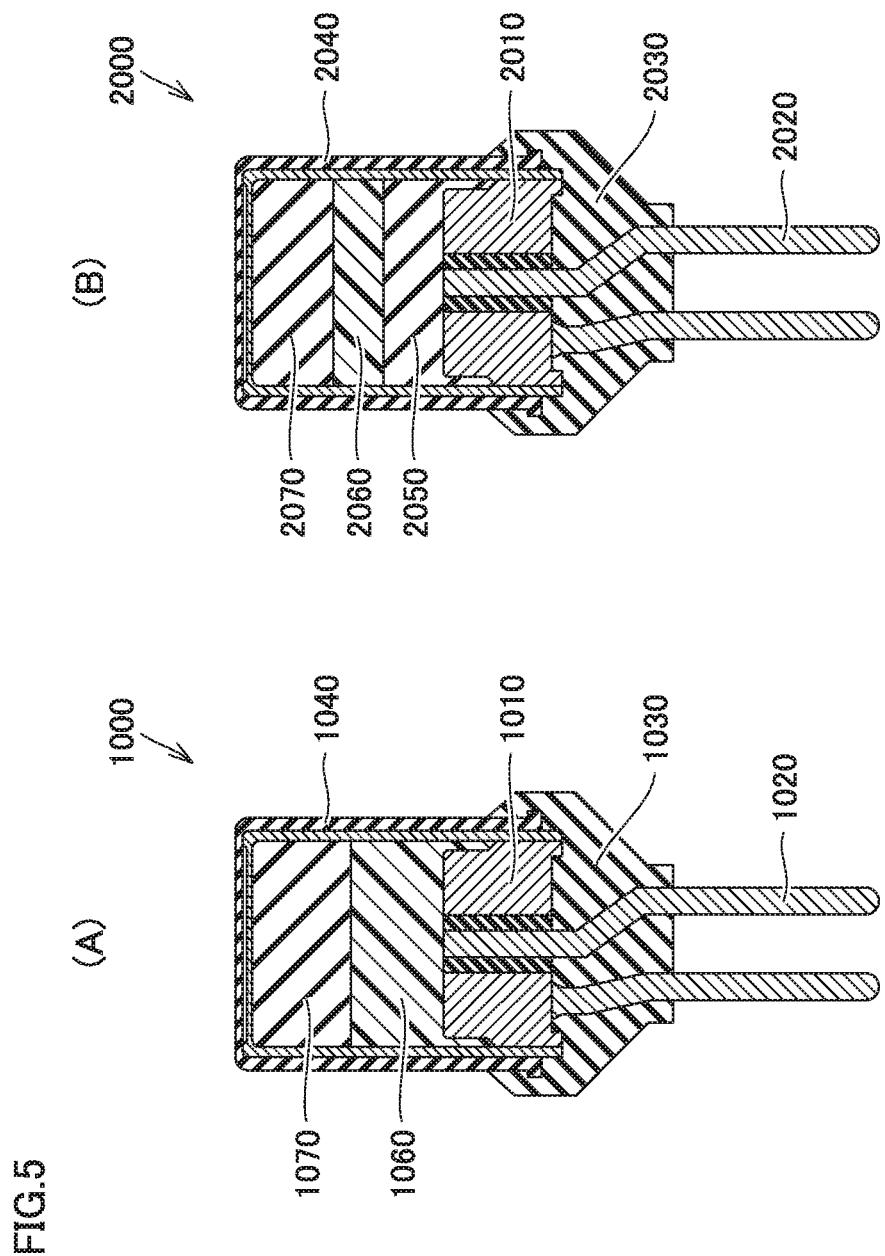
FIG. 5 is a diagram showing an exemplary specific construction of an igniter in a gas generator shown in FIG. 3.

FIGS. 5(A) and (B) is a diagram showing an exemplary specific construction of the igniter when the igniter in gas generator 60 contains a delay charge.

An igniter 1000 shown in FIG. 5(A) mainly includes a plug 1010, a pair of terminal pins 1020, a holder 1030, a cup-shaped member 1040, a delay charge 1060, and an ignited agent 1070. Plug 1010 and cup-shaped member 1040 are held by holder 1030 and a space surrounded by plug 1010 and cup-shaped member 1040 is filled with delay charge 1060 and ignited agent 1070.

The pair of terminal pins 1020 is arranged to pass through holder 1030 and held by holder 1030. One tip ends of the pair of terminal pins 1020 are connected to plug 1010, and the other tip ends of the pair of terminal pins 1020 are arranged to face a space in cup-shaped member 1040 without being connected to plug 1010. The other tip ends of the pair of terminal pins 1020 arranged to face the space in cup-shaped member 1040 are connected to plug 1010 through a not-shown bridge wire (resistor).

A space on a side of plug 1010 in the space surrounded by plug 1010 and cup-shaped member 1040 is filled with delay charge 1060 as being layered so as to be in contact with the bridge wire described above. A space on a side of the bottom of cup-shaped member 1040 in the space surrounded by plug 1010 and cup-shaped member 1040 is filled with ignited agent 1070 as being layered. Delay charge 1060 and ignited agent 1070 provided as being layered are in contact with each other in the space in cup-shaped member 1040.

By using igniter 1000 thus constructed, a current conducts to the bridge wire through the pair of terminal pins 1020, heat is generated in the bridge wire, delay charge 1060 is ignited by heat, and thereafter ignited agent 1070 is ignited by delay charge 1060 after lapse of a prescribed time period. Thereafter, cup-shaped member 1040 is broken by a gas pressure generated by burning of ignited agent 1070.

Therefore, ignition of ignited agent 1070 can be delayed by using gas generator 60 provided with igniter 1000 constructed as above.

An igniter 2000 shown in FIG. 5(B) mainly includes a plug 2010, a pair of terminal pins 2020, a holder 2030, a cup-shaped member 2040, a first ignited agent 2050, a delay charge 2060, and a second ignited agent 2070. Plug 2010 and cup-shaped member 2040 are held by holder 2030 and a space surrounded by plug 2010 and cup-shaped member 2040 is filled with first ignited agent 2050, delay charge 2060, and second ignited agent 2070.

The pair of terminal pins 2020 is arranged to pass through holder 2030 and held by holder 2030. One tip ends of the pair of terminal pins 2020 are connected to plug 2010 and the other tip ends of the pair of terminal pins 2020 are arranged to face a space in cup-shaped member 2040 without being connected to plug 2010. The other tip ends of the pair of terminal pins 2020 arranged to face the space in cup-shaped member 2040 are connected to plug 2010 through a not-shown bridge wire (resistor).

A space on a side of plug 2010 in the space surrounded by plug 2010 and cup-shaped member 2040 is filled with first ignited agent 2050 as being layered so as to be in contact with the bridge wire described above. A space on a side of the bottom of cup-shaped member 2040 in the space surrounded by plug 2010 and cup-shaped member 2040 is filled with second ignited agent 2070 as being layered. A remaining space in the space surrounded by plug 2010 and cup-shaped member 2040 (that is, a space between the space filled with first ignited agent 2050 and the space filled with second ignited agent 2070) is filled with delay charge 2060 as being layered. Delay charge 2060 provided as being layered is thus in contact with both of first ignited agent 2050 and second ignited agent 2070 each provided as being layered in the space in cup-shaped member 2040.

By using igniter 2000 thus constructed, a current conducts to the bridge wire through the pair of terminal pins 2020, heat is generated in the bridge wire, first ignited agent 2050 is ignited by heat, delay charge 2060 is ignited by first ignited agent 2050, and thereafter second ignited agent 2070 is ignited by delay charge 2060 after lapse of a prescribed time period. Thereafter, cup-shaped member 2040 is broken by a gas pressure generated by burning of second ignited agent 2070.

Therefore, by using gas generator 60 provided with igniter 2000 constructed as above, ignition of second ignited agent 2070 can be delayed. Since igniter 2000 constructed as above includes first ignited agent 2050 between the bridge wire and delay charge 2060, it is different from igniter 1000 described above in that the igniter can reliably be activated even when delay charge 2060 low in ignitability is employed.

The delay charge is composed of a composition serving to transmit thermal energy converted in the igniter from electric energy input to the igniter to the combustion agent with a time lag while maintaining the thermal energy. Normally, though the delay charge is often composed of an oxidizer composed of at least one composition selected from the group consisting of various oxides and various peroxides and a reducing agent composed of at least one composition selected from the group consisting of various simple substances of metal, various metal nitrides, various metal silicon compounds, various metal fluorine compounds, various metal sulfides, and various metal phosphorus compounds, an agent composed similarly to a general gas generating agent can also be employed as the delay charge.

The gas generating agent which can be employed as the delay charge contains a reducing agent composed of organic salt, an oxidizer composed of various oxides or peroxides, and various additives. For the reducing agent, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of As the nitrate, for example, sodium nitrate, potassium nitrate, or the like is suitably made use of. As the additive, a binder, a slag formation agent, a combustion modifier, or the like is exemplified. As the binder, for example, metal salt of carboxymethyl cellulose and an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of. Single-base powder, double-base powder, or triple-base powder mainly composed of nitrocellulose may be employed.

By using an ignition delay mechanism (control mechanism) according to each construction described above, timing of expansion of paraglider 10 can appropriately and accurately be controlled by delaying ignition of the igniter for a prescribed time period.

Actuator 88 as the ejection mechanism and the control mechanism described above simultaneously receive an activation signal. Actuator 88 is activated immediately whereas the control mechanism controls operations of gas generator 60 such that paraglider 10 is driven by gas generator 60 and bag-shaped member 50 after actuator 88 starts ejection of paraglider 10. Bag-shaped member 50 and gas generator 60 described above correspond to the drive mechanism that drives paraglider 10 as an expandable object (safety mechanism) (more specifically, the expansion mechanism that expands paraglider 10), and of these, gas generator 60 functions as the drive unit serving as a drive source of paraglider 10.

A mechanism that delays timing of conduction of a current to gas generator 60 from a time point of start of ejection of paraglider 10 by actuator 88 among the ignition delay mechanisms according to the constructions described above falls under an activation delay mechanism. In a mechanism that delays timing of start of burning of the ignited agent by using the delay charge, on the other hand, timing of conduction of a current to gas generator 60 is simultaneous with the time point of start of ejection of paraglider 10 by actuator 88. In any case, however, gas is emitted from gas generator 60 at timing delayed as compared with the time point of start of ejection of paraglider 10 by actuator 88.

Since expansion of paraglider 10 is thus basically started after ejection of paraglider 10 is completed and paraglider 10 is distant to such an extent as not interfering with propulsive mechanism 32 provided in aerial vehicle 30 or other portions, ejection of paraglider 10 is not interfered and paraglider 10 can reliably be expanded.

Canopy 40 of expanded paraglider 10 shown in FIGS. 3 and 4 is foldable by any of three methods below.

The first method is a method of winding up canopy 40 such that a portion of canopy 40 in the rear on the sheet plane in FIG. 3 faces inward while each cell 44 is evacuated. The second method is a method of folding canopy 40 as being collapsed in a longitudinal direction by evacuating each cell 44 such that each cell 44 is collapsed sequentially from the rear side of canopy 40 on the sheet plane in FIG. 3. The third method is a method of folding canopy 40 sequentially by bending canopy 40 as being layered while each cell 44 is evacuated such that each cell 44 is collapsed sequentially from the rear side of canopy 40 on the sheet plane in FIG. 3.

Canopy 40 wound up or folded by any method described above is expanded by activation of gas generator 60 after ejection of paraglider 10 into air (more strictly, emission of gas from gas generator 60 after ejection of paraglider 10 into air).

More specifically, as gas is emitted from gas generator 60 after lapse of a prescribed time period since the time point of start of ejection of paraglider 10 by actuator 88, gas flows into bag-shaped member 50 so that bag-shaped member 50 is inflated and inflation of folded bag-shaped member 50 is started. Inflation of cell 44 in canopy 40 in a portion where gas generator 60 is contained is thus started. Since a negative pressure is developed in the inside of cell 44, outside air is taken through air intake 49 into the cell, and cell 44 on the front side on the sheet plane in FIG. 3 is continuously inflated to a prescribed shape.

In succession, gas generated in gas generator 60 further flows into bag-shaped member 50 and bag-shaped member 50 is further inflated and stretched. Then, adjacent cell 44 is successively inflated by taking in outside air through each air intake 49 sequentially from cell 44 provided with gas generator 60 therein, and cell 44 in the rear on the sheet plane in FIG. 3 is finally expanded.

A shape like canopy 40 shown in FIG. 3 is thus formed in an early stage from the time point of activation of gas generator 60. In consideration of efficiency in expansion, gas generator 60 is disposed more preferably at a position around the center of bag-shaped member 50 arranged along the longitudinal direction of paraglider 10.

When canopy 40 is wound up by the first method described above, bag-shaped member 50 is expanded in accordance with the principles similar to those in blowing of a blowout as a toy by a person, and canopy 40 is accordingly also expanded in a similar manner.

Paraglider 10 expanded as described above is coupled to a main body of aerial vehicle safety apparatus 100 by a plurality of lines 80 coupled to opposing sides of canopy 40 and a lower portion of canopy 40 as shown in FIG. 4. By winding up or unwinding each line 80 by using a motor (not shown) provided separately in aerial vehicle safety apparatus 100, tension to each line 80 can be applied or relaxed, so that a direction of travel of paraglider 10 can also be manipulated by giving an instruction to control the motor (not shown) as appropriate by remote control.

As set forth above, according to the present embodiment, an aerial vehicle safety apparatus simplified in structure and being capable of achieving a shorter time period for expansion of paraglider 10 and expanding paraglider 10 with an extremely smaller amount of gas than in a conventional example and an aerial vehicle including the same can be provided.

Since gas generator 60 is of the explosive type containing the igniter in the present embodiment, gas can instantaneously be generated and a speed of expansion of paraglider 10 can be increased.

Though an example in which bag-shaped member 50 is in a shape of a single elongated tube is illustrated in the present embodiment, limitation thereto is not intended. For example, the bag-shaped member may include a plurality of tubular portions formed radially or in grids such that communication through the inside is established. By running the plurality of tubular portions throughout the inside of the canopy, the plurality of tubular portions can be inflated by gas generated in the gas generator so that the paraglider in a wound or folded state can more readily be expanded.

Though an example in which bag-shaped member 50 is inflated by a single gas generator is illustrated in the present embodiment, bag-shaped member 50 may be inflated by a plurality of gas generators. In particular, when the plurality of tubular portions are provided in the bag-shaped member as described above, a volume of the bag-shaped member is accordingly also increased. Therefore, by inflating the bag-shaped member by using a plurality of gas generators, a speed of expansion of the paraglider can be increased.

First Modification

An aerial vehicle safety apparatus including a parachute as an expandable object and an aerial vehicle including the same will now be described as a first modification.

Figure 6:
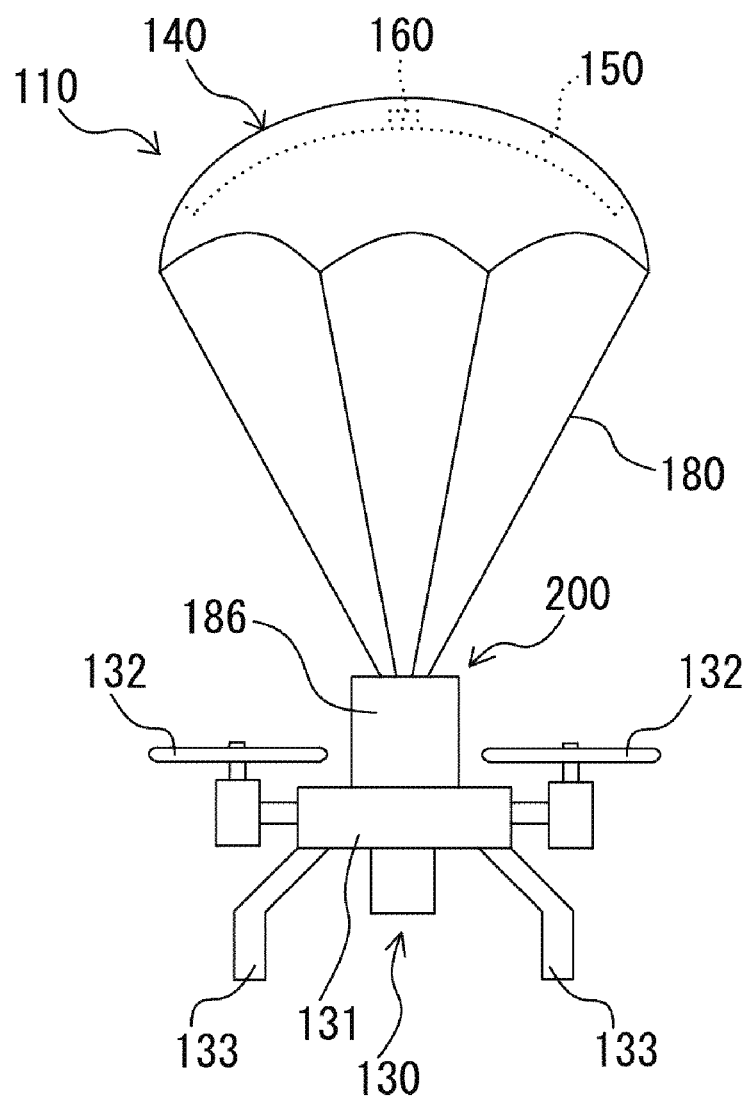
FIG. 6 is a schematic front view showing a state of an aerial vehicle including an aerial vehicle safety apparatus according to a first modification after a parachute is expanded.
Figure 7:
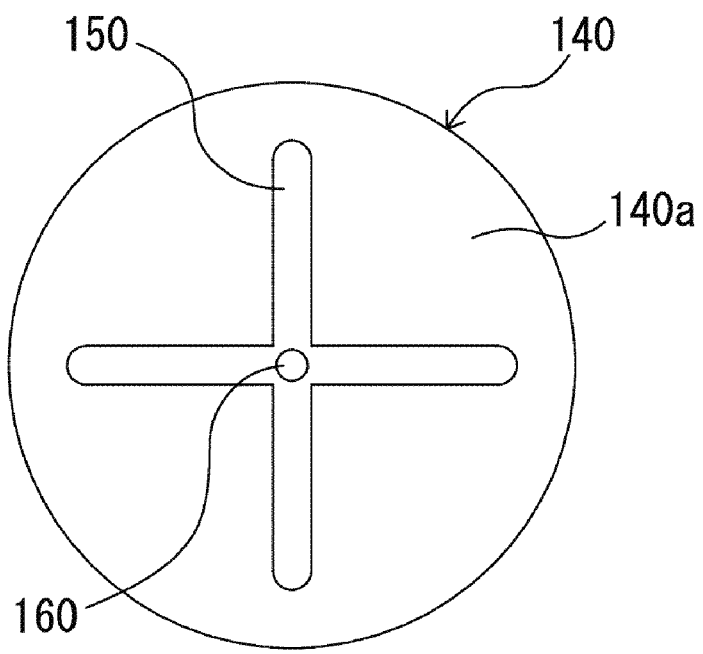
FIG. 7 is a schematic diagram showing an inner construction after the parachute shown in FIG. 6 is expanded.

FIG. 6 is a schematic front view of a state of an aerial vehicle 130 including an aerial vehicle safety apparatus 200 according to the first modification after a parachute 110 is expanded and FIG. 7 is a schematic diagram showing an inner construction after parachute 110 shown in FIG. 6 is expanded. Since features in FIGS. 6 and 7 identical in reference numerals in last two digits to the features shown in FIG. 4 are basically the same as those described with reference to FIG. 4, description thereof may not be provided.

As shown in FIG. 6, though aerial vehicle safety apparatus 200 according to the present modification is substantially similar in construction to aerial vehicle safety apparatus 100 according to the first embodiment, it includes parachute 110 instead of paraglider 10.

As shown in FIGS. 6 and 7, parachute 110 includes a chute 140 foldable to be stored in a housing 186, a bag-shaped member 150 provided on an inner surface 140a of chute 140, and a gas generator 160 capable of supplying gas into bag-shaped member 150. Bag-shaped member 150 and gas generator 160 may be provided on an outer surface of chute 140.

Chute 140 can be made of a material the same as that for the canopy in the first embodiment, and it is one of components that constitute a parachute that can suppress a speed of falling of an object (aerial vehicle 130 here) to which the chute is attached. Chute 140 is connected to housing 186 by a line 180.

Bag-shaped member 150 is inflatably bonded or sewn to inner surface 140a of chute 140 as being foldable before being expanded, similarly to chute 140. Bag-shaped member 150 is constructed to be tubular (like a pipe or a cylinder) in a cross shape as shown in FIG. 7 when it is inflated by flow-in of gas from gas generator 160. Parachute 110 is constructed to be expanded with inflation of folded bag-shaped member 150.

Though an example in which inflated bag-shaped member 150 is in a cross shape is illustrated in the present modification, limitation thereto is not intended. The shape of the inflated bag-shaped member may be, for example, such that a plurality of tubular portions further extend from the center radially or in grids.

Gas generator 160 is similar to gas generator 60 in the first embodiment described above and provided around the center of bag-shaped member 150. Though not shown, also in the present modification, gas generator 160 is connected to an electric circuit similar to that in the first embodiment described above.

According to the present modification constructed as such, a function and effect the same as in the first embodiment can be obtained.

(Second Modification)

An aerial vehicle safety apparatus including an air bag as an expandable object and an aerial vehicle including the same will now be described as a second modification.

Figure 8:
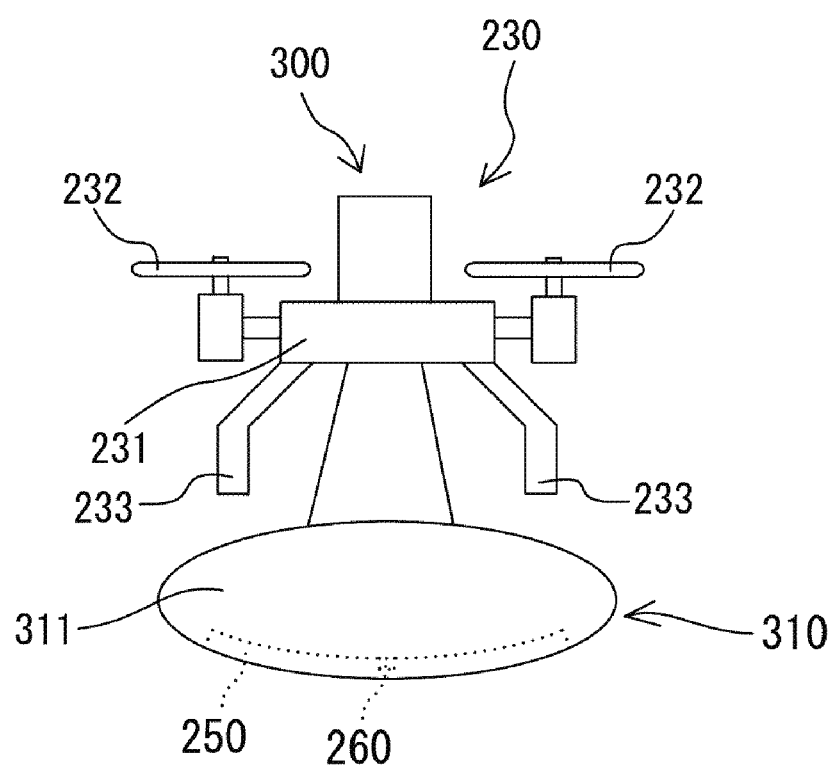
FIG. 8 is a schematic front view showing a state of an aerial vehicle including an aerial vehicle safety apparatus according to a second modification after an air bag is expanded.

FIG. 8 is a schematic front view showing a state of an aerial vehicle 230 including an aerial vehicle safety apparatus 300 according to the second modification after an air bag 311 is expanded. Since features in FIG. 8 identical in reference numerals in last two digits to the features shown in FIG. 4 are basically the same as those described with reference to FIG. 4, description thereof may not be provided.

As shown in FIG. 8, aerial vehicle 230 includes an air bag apparatus 310 that inflates air bag 311 by a gas pressure generated based on an operation of a gas generator (not shown). Air bag apparatus 310 is provided under an airframe 231 in a normal position as being opposed to a main body of aerial vehicle safety apparatus 300 provided on airframe 231 in the normal position, with airframe 231 being interposed.

On an inner side in a lower portion of air bag 311, a bag-shaped member 250 similar to bag-shaped member 150 in the first modification and a gas generator 260 capable of supplying gas into hag-shaped member 250 are provided. In the present modification, bag-shaped member 250 is similar in its expanded shape to bag-shaped member 150 in the first modification, and the shape can also be varied as appropriate to a radial fashion or grids. Bag-shaped member 250 and gas generator 260 may be provided on the outer side of air bag 311. Air bag 311 and bag-shaped member 250 are similar in material to paraglider 10 and bag-shaped member 50 in the first embodiment.

Gas generator 260 is similar to gas generator 60 in the first embodiment described above and provided around the center of bag-shaped member 250. Though not shown, also in the present modification, gas generator 260 is connected to an electric circuit similar to that in the first embodiment described above.

Aerial vehicle safety apparatus 300 according to the present modification thus constructed can achieve a function and effect below.

In aerial vehicle safety apparatus 300 according to the present modification, bag-shaped member 250 can be inflated by operating gas generator 260 after an operation of ordinary air bag apparatus 310 is initiated. Therefore, a portion in air bag 311 where bag-shaped member 250 is provided can be expanded more quickly than other portions. Thus, expanding three of air bag 311 resulting from inflation of bag-shaped member 250 can be added to original expanding fierce of air bag 311 in air bag apparatus 310. Therefore, a structure can be simplified, a time period for expanding air bag 311 can be reduced, and air bag 311 can be expanded with an extremely smaller amount of gas than in a conventional example.

Since expansion of air bag 311 is basically started after ejection of air bag 311 is completed and air bag 311 is distant to such an extent as not interfering with a leg 233 provided in aerial vehicle 230 or other portions, ejection of air bag 311 is not interfered and air bag 311 can reliably be expanded.

Referring now to FIGS. 1, 2, and 4, in the present embodiment, the above-described opening end Where an opening of housing 86 of aerial vehicle safety apparatus 100 is provided, which is a portion for ejection of paraglider 10, is disposed at a position higher than propulsive mechanism 32 of aerial vehicle 30 in the direction of height in which piston 81 as the moving member moves.

According to such a construction, since the opening of aerial vehicle safety apparatus 100 is provided at a position higher than propulsive mechanism 32 in the direction of height (the vertical direction on the sheet plane in FIGS. 2 and 4) of aerial vehicle safety apparatus 100, paraglider 10 is prevented from being entangled with or caught by a component such as propulsive mechanism 32 of aerial vehicle 30 and paraglider 10 can further reliably be expanded.

According to the present embodiment, a mechanism for ejecting paraglider 10 of aerial vehicle safety apparatus 100 and a mechanism for expanding paraglider 10 of aerial vehicle safety apparatus 100 do not have to be controlled through two independent channels but can be controlled through a single channel. Therefore, a configuration of the controller can be simplified. Consequently, an aerial vehicle safety apparatus reduced in weight can be obtained.

Second Embodiment

An aerial vehicle safety apparatus and an aerial vehicle including the same according to a second embodiment will now be described. The aerial vehicle safety apparatus according to the second embodiment includes a paraglider as an expandable object.

Figure 9:
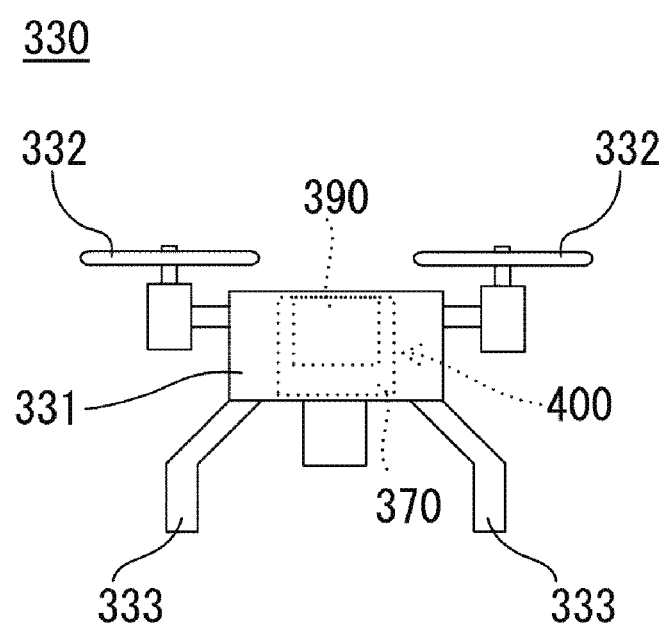
FIG. 9 is a schematic front view of an aerial vehicle including an aerial vehicle safety apparatus according to a second embodiment.

FIG. 9 is a schematic front view of an aerial vehicle 330 including an aerial vehicle safety apparatus 400 according to the second embodiment. As shown in FIG. 9, aerial vehicle 330 includes an airframe 331, at least one propulsive mechanism (for example, a propeller) 332 that is provided in airframe 331 and propels airframe 331, a plurality of legs 333 provided under airframe 331, and aerial vehicle safety apparatus 400. Aerial vehicle safety apparatus 400 is provided in airframe 331.

Figure 10:
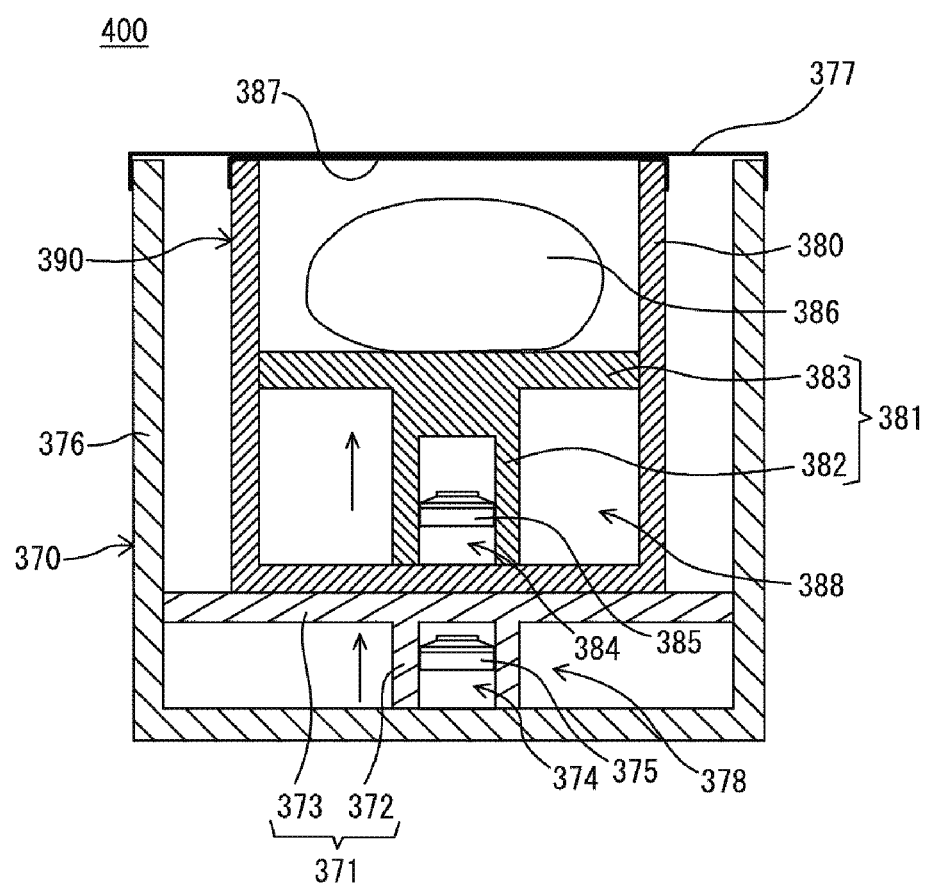
FIG. 10 is a schematic cross-sectional view of the aerial vehicle safety apparatus shown in FIG. 9.

FIG. 10 is a schematic cross-sectional view of aerial vehicle safety apparatus 400 shown in FIG. 9. As shown in FIG. 10, aerial vehicle safety apparatus 400 includes a first ejector 370 and a second ejector 390. First ejector 370 is capable of ejecting a paraglider 386 and second ejector 390, and second ejector 390 is capable of ejecting paraglider 386.

First ejector 370 is formed in airframe 331 (see FIG. 9) and includes an actuator 378. Actuator 378 includes a gas generator 374 including a cup-shaped case 375 that accommodates an ignition agent (not shown), a piston 371 including a recess 372 and a piston head 373 formed integrally with recess 372, and a cylindrical housing 376 with bottom that accommodates piston 371 and restricts a direction of propulsion of piston 371. Second ejector 390 is arranged on piston head 373 as being ejectable.

Gas generator 374 is provided in recess 372. A gas discharge opening is provided at a tip end of gas generator 374 and the gas generator can generate in recess 372, gas serving as propelling power for ejecting piston 371 in a direction shown with an arrow in FIG. 10 by ignition by an electrical signal. Though not shown, a sealing member such as an O ring may be provided between recess 372 and an outer wall of gas generator 374 for preventing gas leakage at the time of activation.

Second ejector 390 includes an actuator 388 and is coupled to first ejector 370 or airframe 331 of aerial vehicle 330 by a lead wire 350 (see FIG. 12) through which a current can conduct. Lead wire 350 is used for transmission of an activation signal from a controller 320 (see FIG. 10) which will be described later to second ejector 390 and/or suspension of aerial vehicle 330 after ejection of second ejector 390. Lead wire 350 is preferably a wire made of a conductive material high in strength such as a steel wire or a wire having a wire rope structure and having a core portion made of a conductive material.

Actuator 388 includes a gas generator 384 including a cup-shaped case 385 that accommodates an ignition agent (not shown), a piston 381 including a recess 382 and a piston head 383 formed integrally with recess 382, and a cylindrical housing 380 with bottom that accommodates piston 381 and restricts a direction of propulsion of piston 381.

Gas generator 384 is provided in recess 382. A gas discharge opening is provided at a tip end of gas generator 384 and the gas generator can generate in recess 382, gas serving as propelling power for ejecting piston 381 in a direction shown with an arrow in FIG. 10 by ignition by an electrical signal. Though not shown, a sealing member such as an O ring may be provided between recess 382 and an outer wall of gas generator 384 for preventing gas leakage at the time of activation.

Paraglider 386 is arranged on piston head 383 and accommodated in housing 380 as being coupled to housing 380 of second ejector 390 by a coupling member 351 (see FIG. 12(B)). At least one of coupling members 351 preferably includes a steel wire in consideration of strength and its role as a current conduction line to a gas generator 386b (see FIG. 10) which will be described later.

Figure 11:
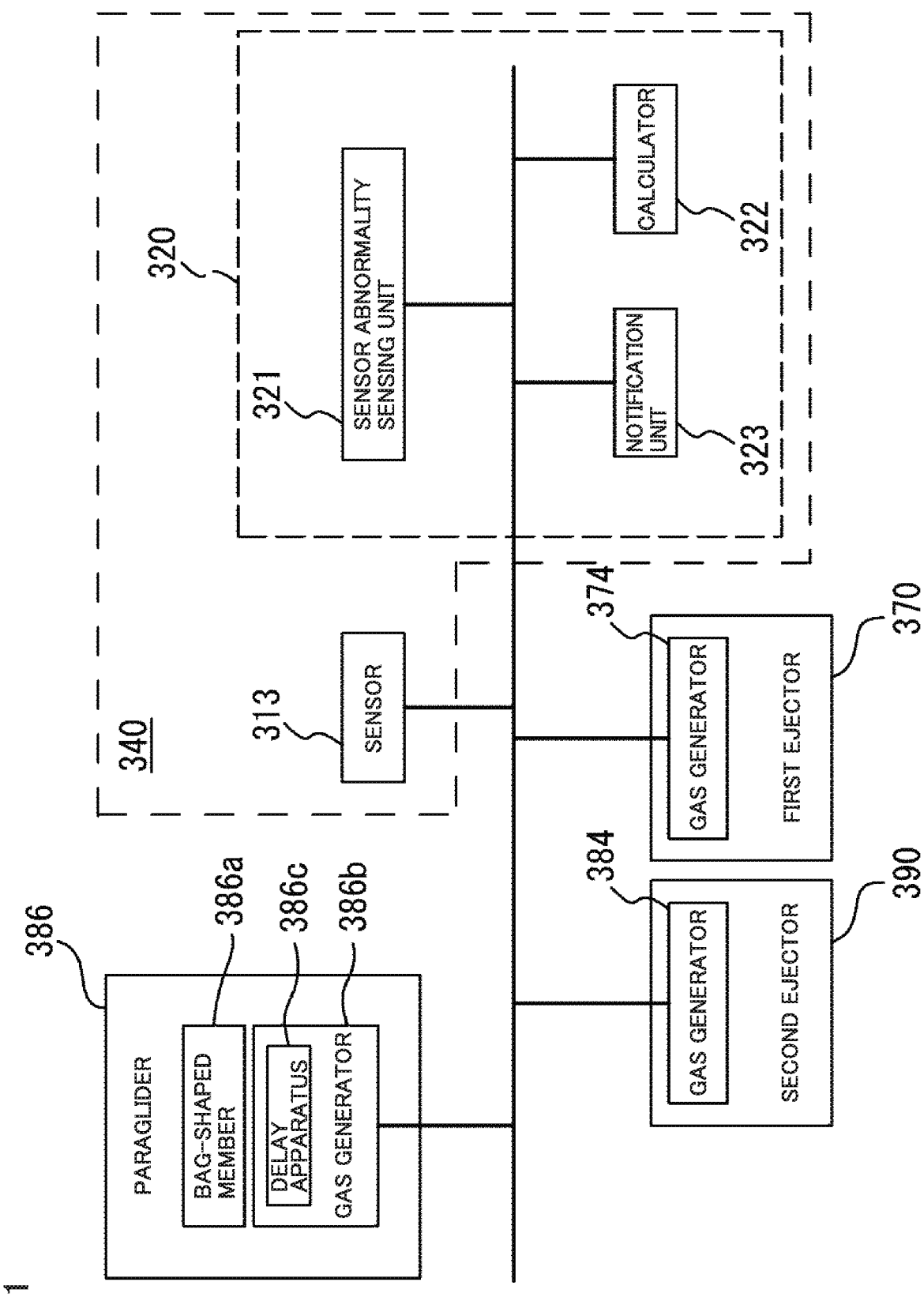
FIG. 11 is a functional block diagram of the aerial vehicle safety apparatus in the aerial vehicle shown in FIG. 9.

Paraglider 386 includes a bag-shaped member 386a (see FIGS. 11 and 12(B)) provided inside or outside a main body (that is, a canvas member or the like) of paraglider 386 along a surface of the main body of paraglider 386 and gas generator 386b (see FIG. 10) capable of allowing gas to flow into bag-shaped member 386a. Bag-shaped member 386a and gas generator 386b are main components of a mechanism for expanding paraglider 386.

Bag-shaped member 386a is similar to bag-shaped member 50 in the first embodiment, and constructed to be foldable or wound together with or separately from the main body of paraglider 386. Bag-shaped member 386a is constructed to be inflated when gas generated by gas generator 386b flows thereinto and thus to quickly expand the main body of paraglider 386. Though examples of bag-shaped member 386a include a bag-shaped member which becomes tubular when it is inflated, any bag-shaped member is applicable so long as the bag-shaped member can quickly expand the main body of paraglider 386.

Gas generator 386b includes a delay apparatus 386c (see FIG. 11) capable of delaying time of activation of gas generator 386b to prescribed time after reception of an activation signal. Examples of delay apparatus 386c include an explosive type timer apparatus that incorporates a delay charge in an igniter to adjust timing of ignition similarly to what is called a delay electric detonator, a mechanical timer apparatus that uses a motor and a plurality of gears to adjust timing, and an electric timer apparatus that incorporates an electric IC timer together with a secondary battery.

Aerial vehicle safety apparatus 400 includes an abnormality detection apparatus 340 (see FIG. 11) including an acceleration sensor that detects an abnormal condition of aerial vehicle 330.

FIG. 11 is a functional block diagram of aerial vehicle safety apparatus 400 in aerial vehicle 330 shown in. FIG. 9. A functional configuration of abnormality detection apparatus 340 will now be described. As shown in FIG. 11, abnormality detection apparatus 340 includes a sensor (sensing unit) 313 and a controller (a computer including a central processing unit (CPU), a read only memory (ROM), and a random access memory (RAM)) 320, and it is electrically connected to an igniter (not shown in FIG. 11) in gas generator 374 of first ejector 370 and an igniter (not shown in FIG. 11) in gas generator 384 of second ejector 390 and electrically connected to an igniter (not shown in FIG. 11) in gas generator 386b of paraglider 386 with delay apparatus 386c being interposed.

Sensor 313 senses a state of flight (including collision and crash) of aerial vehicle 330. Specifically, sensor 313 is implemented by at least one selected, for example, from among an acceleration sensor, a gyro sensor, a barometric pressure sensor, a laser sensor, and an ultrasonic sensor, and can obtain data on a state of flight of aerial vehicle 330 such as a speed, an acceleration, an inclination, an altitude, and a position of aerial vehicle 330.

Controller 320 includes a sensor abnormality sensing unit 321, a calculator 322, and a notification unit 323 as a functional configuration. Sensor abnormality sensing unit 321, calculator 322, and notification unit 323 are functionally implemented by execution of a prescribed program by controller 320.

Sensor abnormality sensing unit 321 senses an abnormal state of sensor 313. Sensor abnormality sensing unit 321 senses whether or not sensor 313 can normally operate.

Calculator 322 determines whether or not a state of flight of aerial vehicle 330 is abnormal based on data obtained by actual measurement by sensor 313. Specifically, calculator 322 determines whether or not aerial vehicle 330 has received impact (or makes determination as to collision) or predicts crash of aerial vehicle 330. When calculator 322 determines that the state of flight of aerial vehicle 330 is abnormal, it outputs an abnormality signal (which may also include an instruction signal for starting up or activating other equipment) to the outside. An abnormality signal output unit may be provided separately from calculator 322, and the abnormality signal output unit may output an abnormality signal in response to an instruction from calculator 322.

When sensor abnormality sensing unit 321 senses an abnormal condition of sensor 313, notification unit 323 gives a manager a notification to the effect that the abnormal condition of sensor 313 has been sensed.

Figure 12:
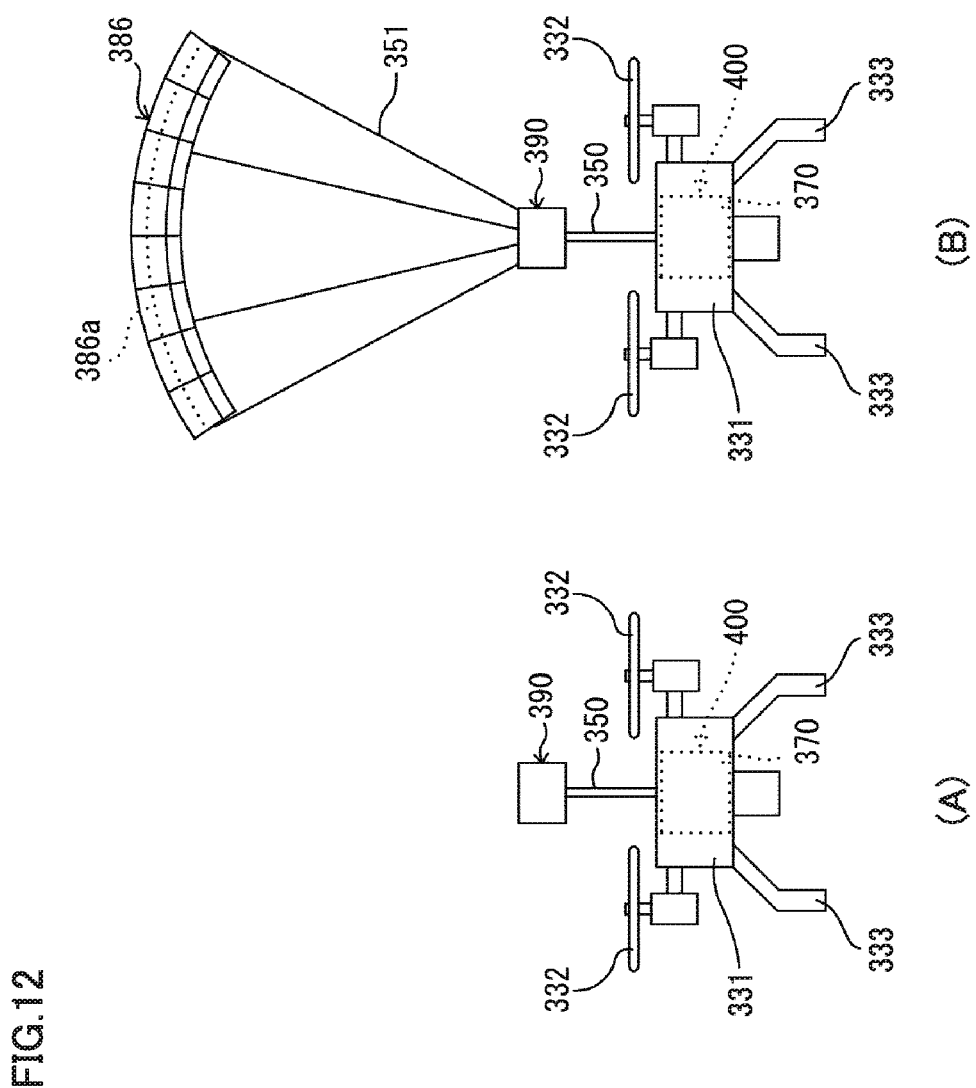
FIG. 12 is a diagram tier illustrating a state of activation of the aerial vehicle safety apparatus in the aerial vehicle shown in FIG. 9.

Operations by abnormality detection apparatus 340 in the present embodiment configured as described above will now be described and a state of activation of the aerial vehicle safety apparatus in the aerial vehicle shown in FIG. 9 will also be described together. FIG. 12 is a diagram for illustrating a state of activation of aerial vehicle safety apparatus 400 in aerial vehicle 330 shown in FIG. 9.

Initially, sensor abnormality sensing unit 321 conducts an abnormality test of sensor 313. Specifically, sensor abnormality sensing unit 321 conducts a test as to whether or not an acceleration sensor that measures an acceleration of aerial vehicle 330 normally operates.

When it is determined that the sensor is abnormal as a result of the test, sensor abnormality sensing unit 321 gives an error notification to a manager and quits its operation. When it is determined that there is no abnormality as a result of the test, calculator 322 reads data actually obtained by sensor 313.

When calculator 322 determines that the state of flight of aerial vehicle 330 is not abnormal based on the data obtained by actual measurement by sensor 313, in succession, it reads data actually obtained by sensor 313.

When calculator 322 determines that the state of flight of aerial vehicle 330 is abnormal based on the obtained data, it outputs a safety apparatus start-up signal (an abnormality signal) to gas generator 374 in first ejector 370 of aerial vehicle safety apparatus 400.

First ejector 370 is started up by receiving the safety apparatus start-up signal. Thus, as shown in FIG. 12(A), piston 371 is propelled by gas generated by gas generator 374, and thus second ejector 390 is directly driven out and instantaneously ejected to a position distant from propulsive mechanism 332 outside airframe 331. The opening end where the opening of housing 376 is provided is closed by a lid 377 (see FIG. 10) in the initial state, and lid 377 is removed from the opening end as second ejector 390 is driven out.

In succession, after lapse of a prescribed time period or at the time point when second ejector 390 reaches the position shown in FIG. 12(A), calculator 322 simultaneously outputs the safety apparatus start-up signal (abnormality signal) to gas generator 384 in second ejector 390 of aerial vehicle safety apparatus 400 and gas generator 386b of paraglider 386.

Second ejector 390 is started up by receiving the safety apparatus start-up signal. Thus, as piston 381 is propelled by gas generated by gas generator 384, paraglider 386 is directly driven out and ejected. The opening end where the opening of housing 380 is provided is closed by a lid 387 (see FIG. 10) in the initial state, and lid 387 is removed from the opening end as paraglider 386 is driven out.

Gas generator 386b of paraglider 386 which has received the safety apparatus start-up signal simultaneously with second ejector 390 is started up after lapse of a prescribed time period owing to the function of delay apparatus 386c, and allows gas to flow into bag-shaped member 386a by generating gas. Bag-shaped member 386a is thus inflated to a tubular shape and accordingly paraglider 386 is quickly expanded.

Thus, according to the present embodiment, first ejector 370, second ejector 390, and the mechanism for expanding paraglider 386 do not have to be controlled through three independent channels but can be controlled through two channels. Therefore, the configuration of controller 320 can be simplified. Consequently, an aerial vehicle safety apparatus reduced in weight can be obtained. By incorporating the delay apparatus not only in gas generator 386b of paraglider 386 but also in gas generator 384 of second ejector 390, first ejector 370, second ejector 390, and the mechanism for expanding paraglider 386 can also be controlled through a single channel and further reduction in weight can be achieved.

According to the present embodiment, first ejector 370 can eject second ejector 390 to a prescribed position and thereafter second ejector 390 can eject paraglider 386 into air at that position and expand the paraglider. Therefore, paraglider 386 is prevented from being entangled with or caught by each component such as propulsive mechanism 332 of aerial vehicle 330 and paraglider 386 can reliably be expanded.

Third Embodiment

An aerial vehicle safety apparatus and an aerial vehicle including the same according to a third embodiment will now be described. The aerial vehicle safety apparatus according to the third embodiment includes a paraglider as an expandable object. Since features in the present embodiment identical in reference numerals in last two digits to the features shown in FIGS. 9 to 12 described previously are basically the same as those described with reference to FIGS. 9 to 12, description thereof may not be provided. Other features in the present embodiment are the same as in the second embodiment described above, unless otherwise specified.

Figure 13:
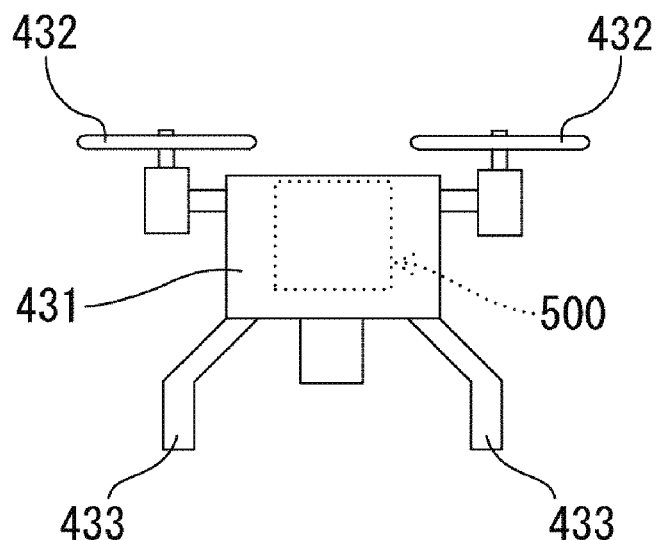
FIG. 13 is a schematic front view of an aerial vehicle including an aerial vehicle safety apparatus according to a third embodiment.
Figure 14:
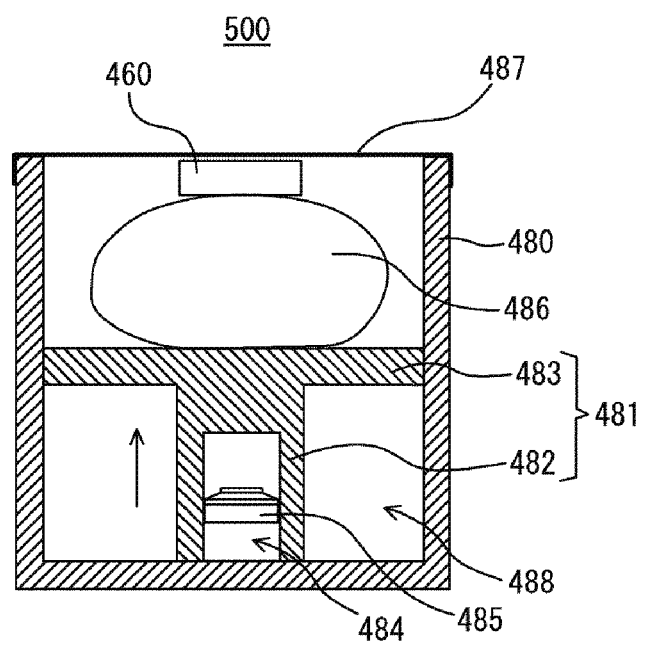
FIG. 14 is a schematic cross-sectional view of the aerial vehicle safety apparatus shown in FIG. 13.

FIG. 13 is a schematic front view of an aerial vehicle 430 including an aerial vehicle safety apparatus 500 according to the third embodiment, and FIG. 14 is a schematic cross-sectional view of aerial vehicle safely apparatus 500 shown in FIG. 13. As shown in FIGS. 13 and 14, aerial vehicle 430 includes aerial vehicle safety apparatus 500 different in construction from aerial vehicle safety apparatus 400 according to the second embodiment.

Though aerial vehicle safety apparatus 500 includes the second ejector substantially the same in construction as second ejector 390 in aerial vehicle safety apparatus 400, it is different in that a drogue chute (draw-out parachute) ejector 460 (corresponding to the first ejector) is provided on a paraglider 486.

Figure 15:
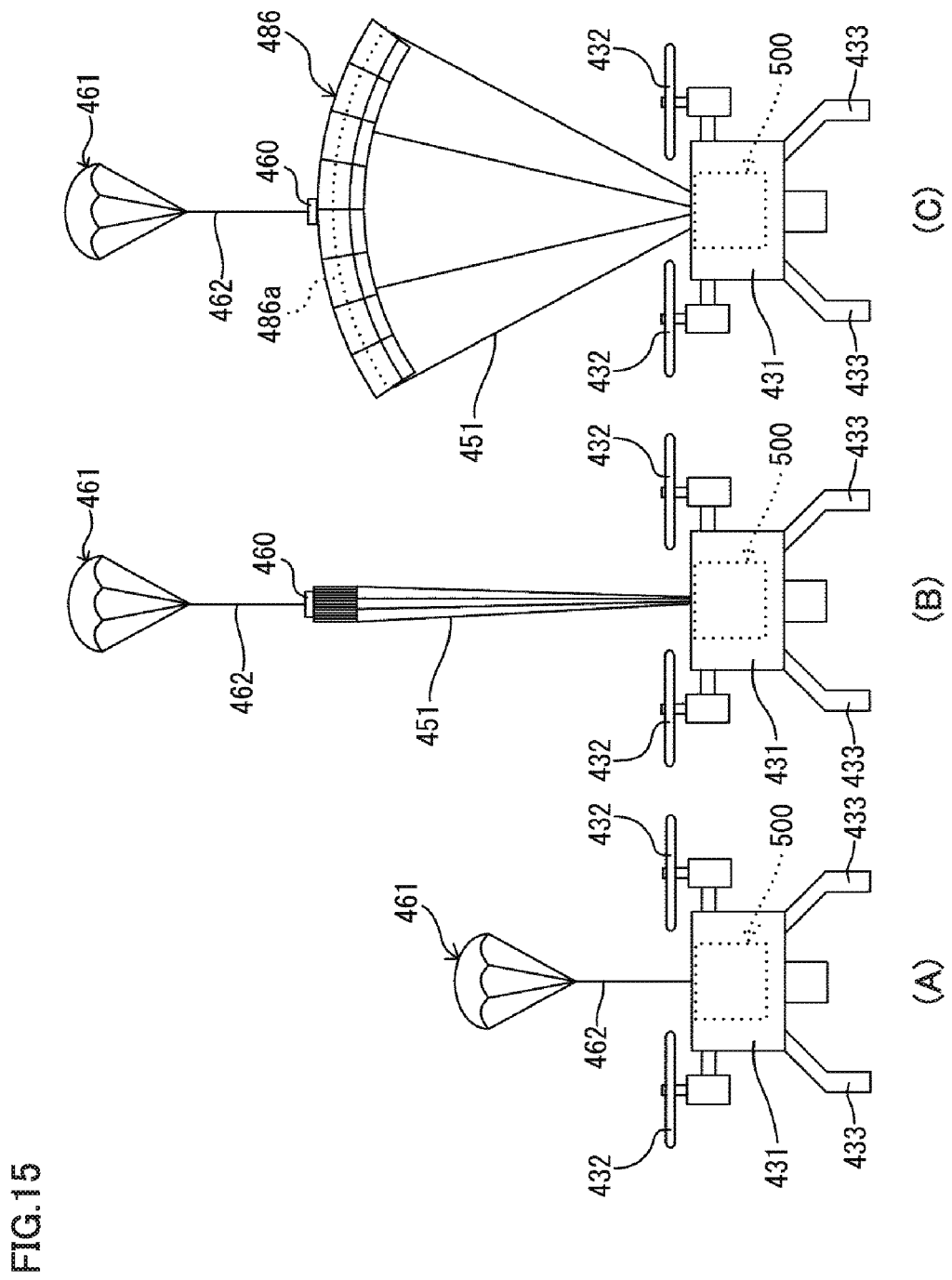
FIG. 15 is a diagram for illustrating a state of activation of the aerial vehicle safety apparatus in the aerial vehicle shown in FIG. 13.

Drogue chute ejector 460 can eject a drogue chute 461 (see FIG. 15). An ejection mechanism similar to second ejector 390 in aerial vehicle safety apparatus 400 can be employed as a mechanism for ejecting drogue chute 461 in drogue chute ejector 460. Drogue chute 461 is coupled to paraglider 486 by a string member 462 (see FIG. 15). From a point of view of strength, string member 462 is preferably made of reinforced fibers such as polyamide fibers or polyester fibers or metal fibers such as a steel wire.

Operations of aerial vehicle 430 including aerial vehicle safety apparatus 500 constructed as described above will now be described. FIG. 15 is a diagram for illustrating a state of activation of aerial vehicle safety apparatus 500 in aerial vehicle 430 shown in FIG. 13.

When an abnormality detection apparatus configured similarly to abnormality detection apparatus 340 in the embodiment described above detects occurrence of an abnormal condition in aerial vehicle 430, the abnormality detection apparatus outputs a start-up signal for drogue chute ejector 460.

Drogue chute ejector 460 is started up by receiving the start-up signal. Drogue chute 461 is thus ejected to the outside as shown in. FIG. 15(A). A lid 487 (see FIG. 14) is removed from a container 480 by propelling power of drogue chute 461.

After lapse of a prescribed time period since start-up of drogue chute ejector 460, the abnormality detection apparatus outputs a safety apparatus start-up signal simultaneously to a gas generator 484 (see FIG. 14) of the second ejector of aerial vehicle safety apparatus 500 and a gas generator of paraglider 486 (similar to gas generator 386b in the second embodiment described above).

The second ejector of aerial vehicle safety apparatus 500 is started up by receiving the safety apparatus start-up signal and ejects paraglider 486. Since drogue chute 461 has previously been ejected, paraglider 486 is quickly drawn out by drogue chute 461 with string member 462 being interposed.

The gas generator of paraglider 486 which has received the safety apparatus start-up signal simultaneously with the second ejector of aerial vehicle safety apparatus 500 is started up, for example, in a state shown in FIG. 15(B) after lapse of a prescribed time period owing to a function of a delay apparatus (similar to delay apparatus 386c in the second embodiment described above), and allows gas to flow into a bag-shaped member 486a. Bag-shaped member 486a is thus inflated and paraglider 486 is quickly expanded as shown in FIG. 15(C).

Thus, according to the present embodiment, the mechanism for ejecting paraglider 486 of aerial vehicle safety apparatus 500 and the mechanism for expanding paraglider 486 (mainly including bag-shaped member 486a and the gas generator) do not have to be controlled through two independent channels but can be controlled through a single channel. Therefore, the configuration of the controller can be simplified. Consequently, the aerial vehicle safety apparatus can be reduced in weight.

According to the present embodiment, drogue chute 461 is ejected in advance so that paraglider 486 can quickly be drawn to a prescribed position while it is ejected and thereafter paraglider 486 can be expanded at that position. Therefore, paraglider 486 is prevented from being entangled with or caught by each component such as propulsive mechanism 432 of aerial vehicle 430 and paraglider 486 can reliably be expanded.

(Third Modification)

An aerial vehicle safety apparatus including a paraglider and an air bag as objects to be expanded and an aerial vehicle including the same will now be described as a third modification.

Figure 16:
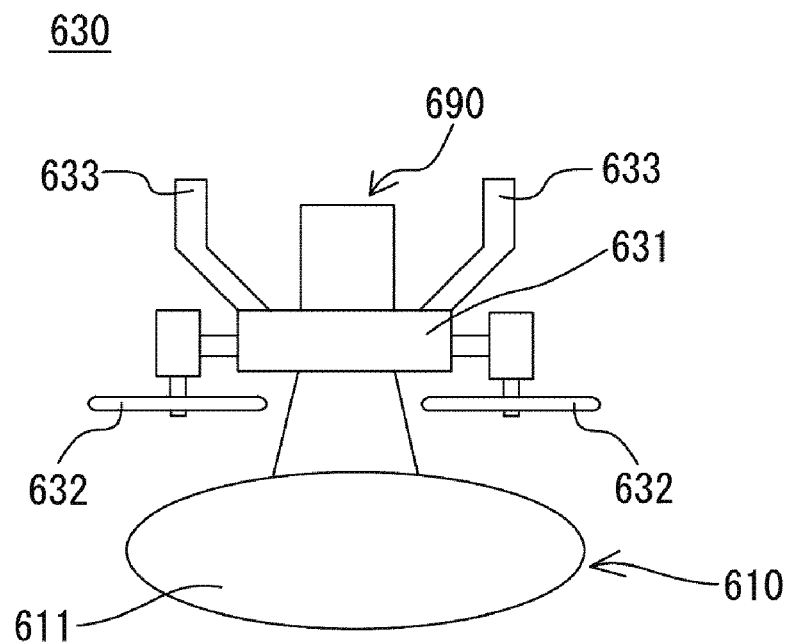
FIG. 16 is a schematic front view showing a state of an aerial vehicle including an aerial vehicle safety apparatus according to a third modification after an air bag is expanded.

FIG. 16 is a schematic front view showing a state of an aerial vehicle 630 including an aerial vehicle safety apparatus 690 according to the third modification after an air bag 611 is expanded. Since features in FIG. 16 identical in reference numerals in last two digits to the features shown in FIG. 4 are basically the same as those described with reference to FIG. 4, description thereof may not be provided.

As shown in FIG. 16, unlike aerial vehicle safety apparatus 100 according to the first embodiment, aerial vehicle safety apparatus 690 according to the present modification has a main body provided under an airframe 631 of aerial vehicle 630 in a normal position and an air bag apparatus 610 which is a part of aerial vehicle safety apparatus 690 is further provided above airframe 631 in the normal position so as to be opposed to the main body of aerial vehicle safety apparatus 690 provided under airframe 631 in the normal position with airframe 631 being interposed.

Air bag apparatus 610 includes air bag 611 and a gas generator and inflates air bag 611 by a gas pressure generated based on an ignition operation by the gas generator. Any gas generator is applicable so long as it is capable of supplying gas into the air bag and it may be of an explosive type including an igniter or of a canister type instead.

The main body of aerial vehicle safety apparatus 690 is similar to that of aerial vehicle safety apparatus 100 according to the embodiment and constructed to be able to eject a paraglider.

According to such a construction, when an abnormality detection apparatus mounted on air bag apparatus 610 determines a state of flight of aerial vehicle 630 as being abnormal based on data obtained by actual measurement by a sensor (not shown), a safety apparatus startup signal is output from the abnormality detection apparatus configured similarly to abnormality detection apparatus 340 described above to the gas generator of air bag apparatus 610 to thereby activate the gas generator.

As the gas generator is activated, air bag 611 is ejected by the gas pressure generated by the gas generator and inflated. In the event of falling of aerial vehicle 630, an obstacle and a mounted object and in particular a pedestrian can thus be protected.

When the abnormality detection apparatus mounted on air bag apparatus 610 determines the state of flight of aerial vehicle 630 as not being abnormal based on data obtained by actual measurement by the sensor (not shown), the abnormality detection apparatus does not output the safety apparatus start-up signal to the gas generator.

Thus, when an abnormality detection apparatus is provided in air bag apparatus 610, an erroneous operation of air bag apparatus 610 can more reliably be prevented. Therefore, reliability in an aspect of safety of air bag apparatus 610 can be improved. Other functions and effects are the same as in aerial vehicle safety apparatus 100 described above.

(Fourth Modification)

An aerial vehicle safety apparatus including a paraglider and an air bag as objects to be expanded and an aerial vehicle including the same will now be described as a fourth modification.

FIG. 17 is a schematic front view showing a state of an aerial vehicle 730 including an aerial vehicle safety apparatus 790 according to the fourth modification after an air bag 711 is expanded. Since features in FIG. 17 identical in reference numerals in last two digits to the features shown in FIG. 4 are basically the same as those described with reference to FIG. 4, description thereof may not be provided.

As shown in FIG. 17, unlike aerial vehicle safety apparatus 100 according to the first embodiment, aerial vehicle safety apparatus 790 according to the present modification has an air bag apparatus 710 which is a part of aerial vehicle safety apparatus 790 provided under an airframe 731 in a normal position as being opposed to a main body of aerial vehicle safety apparatus 790 provided on airframe 731 of aerial vehicle 730 in the normal position, with airframe 731 being interposed.

Air bag apparatus 710 includes air bag 711 and a gas generator and inflates air bag 711 by a gas pressure generated based on an ignition operation by the gas generator. Any gas generator is applicable so long as it is capable of supplying gas into the air bag and it may be of an explosive type including an igniter or of a canister type instead.

The main body of aerial vehicle safety apparatus 790 is similar to that of aerial vehicle safety apparatus 100 according to the embodiment and constructed to be able to eject a paraglider.

According to such a construction, when an abnormality detection apparatus mounted on air bag apparatus 710 determines a state of flight of aerial vehicle 730 as being abnormal based on data obtained by actual measurement by a sensor (not shown a safety apparatus start-up signal is output from the abnormality detection apparatus configured similarly to abnormality detection apparatus 340 described above to the gas generator of air bag apparatus 710 to thereby activate the gas generator.

As the gas generator is activated, air bag 711 is ejected by the gas pressure generated by the gas generator and inflated. In the event of falling of aerial vehicle 730, an obstacle and a mounted object and in particular a pedestrian can thus be protected. In the present modification, various devices often provided under airframe 731 can also be protected by air bag 711.

When the abnormality detection apparatus mounted on air bag apparatus 710 determines the state of flight of aerial vehicle 730 as not being abnormal based on data obtained by actual measurement by the sensor (not shown), the abnormality detection apparatus does not output the safety apparatus start-up signal to the gas generator.

Thus, when an abnormality detection apparatus is provided in air bag apparatus 710, an erroneous operation of air bag apparatus 710 can more reliably be prevented. Therefore, reliability in an aspect of safety of air bag apparatus 710 can be improved. Other functions and effects are the same as in aerial vehicle safety apparatus 100 described above.

(Lowering in Speed in the Event of Falling of Aerial Vehicle by Using Aerial Vehicle Safety Apparatus)

From a point of view of securing safety in the event of falling of an unmanned aircraft, various laws and regulations have recently been developed in each country. One of such laws and regulations is restriction of an impact value at the time of collision of an unmanned aircraft with some kind of an object in the event of falling to a prescribed value or smaller. The upper limit of the allowable impact value may be restricted, for example, to be smaller than 69 [J] although the value is different from country to country.

In order to lower a speed of an aerial vehicle so as to achieve the impact value smaller than 69 [J], the aerial vehicle should be decelerated to satisfy relation of $69 [J] > (\frac{1}{2}) \times m \times V^2$ where m [kg] represents a total weight of an aerial vehicle including an aerial vehicle safety apparatus and v [m/s] represents a speed of the aerial vehicle when it falls. Therefore, when a total weight m is not lighter than 1 [kg] and not heavier than 1000 [kg], the aerial vehicle should be decelerated in an early stage such that the speed of the aerial vehicle is from 0.3 [m/s] to at most 11.7 [m/s] in accordance with the total weight.

Therefore, the aerial vehicle safety apparatus and the aerial vehicle including the same according to the first to third embodiments and the first to fourth modifications described above should importantly be designed to achieve lowering in speed by expanding an expandable object such as a parachute or a paraglider in the early stage.

As described above, from a point of view of deceleration of the aerial vehicle without delay, a time period from a time point of ejection by the ejection apparatus until start of expansion of the expandable object is preferably shorter and the time period is preferably within ten seconds, more preferably within eight seconds, further preferably within five seconds, or within three seconds or one second in some cases. Since the time period from start of ejection of the expandable object until completion of expansion is different depending on a length of a coupling member (that is, a line or a cord) connecting the expandable object and the aerial vehicle to each other or a total weight of the aerial vehicle, timing of start of expansion of the expandable object should accordingly be adjusted as appropriate.

An example in which an expandable object such as a parachute or a paraglider is expanded at once from the non-expanded state where the expandable object is wound or folded is illustrated and described in connection with the aerial vehicle safety apparatus and the aerial vehicle including the same according to the first to third embodiments and the first to fourth modifications described above. When the construction is as such, however, excessively large impact applied to the aerial vehicle in expansion of the expandable object is also a concern.

Therefore, impact applied to the aerial vehicle can also be mitigated by constructing the expandable object so as to be expanded in multiple stages by providing a plurality of objects to be expanded and varying timing of expansion thereof or by dividing a single expandable object into areas that can be expanded in one expansion and expanding these areas at different timing. From a point of view of achieving both of mitigation of impact applied to the aerial vehicle and simplification of an apparatus construction, the expandable object is preferably constructed so as to be expanded in two or three stages.

(Other Modifications)

Though an example in which the sensor abnormality sensing unit, the calculator, and the notification unit are functionally implemented by software is illustrated in the embodiments and the modifications thereof described above, limitation thereto is not intended and they may be implemented by hardware.

Though an example in which an explosive type gas generator is mainly employed as the gas generator is illustrated in the embodiments and the modifications thereof described above, a gas generator of another type such as a canister type may be employed. A micro gas generator (MGG) or a squib structured such that a gas discharge opening is provided by increase in internal pressure by gas generated at the time of activation may be employed instead of the gas generator described above as the gas generator of another explosive type different from the explosive type gas generator described above.

Characteristic features shown in the embodiments and the modifications thereof described above can be combined with one another.

Though an aerial vehicle safety apparatus including at least any of a parachute, a paraglider, and an air bag as the safety mechanism is illustrated in the embodiments and the modifications thereof described above, the safety mechanism is not limited thereto and the present invention is applicable to an aerial vehicle safely apparatus including a safety mechanism as below, other than the above.

For example, an aerial vehicle safety apparatus including a safety mechanism capable of emitting a pyrotechnic signal by using a drive mechanism may be applicable. The outside can be notified of an abnormal condition of an aerial vehicle and the pyrotechnic signal can be a mark for a location of retrieval in the event of crash of the aerial vehicle.

Alternatively, an aerial vehicle safety apparatus including a safety mechanism capable of ejecting a net (web) by using a drive mechanism may be applicable. By thus timely ejecting a net toward a hook or a protrusion, an aerial vehicle can be caught by the hook or the protrusion. Consequently, the aerial vehicle can be prevented from falling on and colliding against the ground.

Alternatively, an aerial vehicle safety apparatus including a safety mechanism capable of ejecting a shrunk or folded ring buoy (float) by using an ejection mechanism together with a drive mechanism and inflating and expanding the ring buoy by using the drive mechanism may be applicable. An aerial vehicle can thus be prevented from submerging and the ring buoy can be a mark for a location of retrieval in the event of crash of the aerial vehicle.

Alternatively, an aerial vehicle safety apparatus including a safety mechanism capable of ejecting a shrunk or folded ring buoy (float) and a parachute by using an ejection mechanism together with a drive mechanism and expanding the ring buoy and the parachute by using the drive mechanism may be applicable. Thus, a speed of falling in the event of crash of an aerial vehicle can be lowered, the aerial vehicle can be prevented from submerging, and the ring buoy and the parachute can be a mark for a location of retrieval in the event of crash of the aerial vehicle.

Alternatively, an aerial vehicle safety apparatus including a safety mechanism capable of ejecting a parachute together with a drive mechanism by using an ejection mechanism, cutting at least one of a plurality of coupling members that couple the parachute and an aerial vehicle to each other by using the drive mechanism after expansion of the parachute, causing the aerial vehicle to fall with the center of gravity of an airframe being displaced to turn the airframe sideways, and thereafter mitigating impact of collision against the ground by using an air bag apparatus provided in a side surface of the aerial vehicle on a falling side may be applicable.

Alternatively, an aerial vehicle safety apparatus including a safety mechanism capable of ejecting what is called a paramotor together with a drive mechanism by using an ejection mechanism and driving a motor by using the drive mechanism after full expansion of a parachute or a paraglider to rotate a propeller may be applicable. The parachute or the paraglider is thus prevented from being entangled with the propeller. The paramotor can fly by obtaining thrust by providing motive power (a propeller rotating machine based on a motor) in a harness of the parachute or the paraglider.

Alternatively, an aerial vehicle safety apparatus including a safety mechanism capable of ejecting a sound emission apparatus together with a drive mechanism by using an ejection mechanism, activating the sound emission apparatus in the event of crash of an aerial vehicle by using the drive mechanism, and notifying surroundings of danger may be applicable.

Alternatively, an aerial vehicle safety apparatus including a safety mechanism capable of ejecting an illumination apparatus (for example, a flash light) together with a drive mechanism by using an ejection mechanism, activating the illumination apparatus in the event of crash of an aerial vehicle by using the drive mechanism, and notifying surroundings of danger may be applicable.

Alternatively, an aerial vehicle safety apparatus including a safety mechanism capable of ejecting a fire extinguisher together with a drive mechanism by using an ejection mechanism, activating the fire extinguisher in the event of crash of an aerial vehicle by using the drive mechanism, and spraying an extinguishant to an airframe of the aerial vehicle and the surroundings may be applicable.

Alternatively, an aerial vehicle safety apparatus including a safety mechanism capable of ejecting a mounted object (for example, expensive apparatuses) with parachute mounted in advance to be ejectable by using an ejection mechanism and expanding the parachute for the mounted object with parachute by using a drive mechanism may be applicable. The mounted object with parachute can thus be protected with importance being placed thereon.

Alternatively, an aerial vehicle safety apparatus including a safety mechanism capable of ejecting a mounted object (for example, expensive apparatuses) with air bag apparatus mounted in advance to be ejectable by using an ejection mechanism and expanding by inflating an air bag for the mounted object with air bag apparatus by using a drive mechanism may be applicable. The mounted object with air bag apparatus can thus be protected with importance being placed thereon.

Alternatively, an aerial vehicle safety apparatus including a safety mechanism capable of ejecting a rescue signal transmission apparatus together with a drive mechanism by using an ejection mechanism, activating the rescue signal transmission apparatus in the event of crash of an aerial vehicle by using the drive mechanism, and transmitting a rescue signal to the outside may be applicable. Thus, in the event of crash of the aerial vehicle, a point of crash can be identified.

Alternatively, an aerial vehicle safety apparatus including a safety mechanism that ejects a black box (a flight recorder or the like) with parachute together with a drive mechanism by using an ejection mechanism and expands the parachute of the black box with parachute in the event of crash of an aerial vehicle by using the drive mechanism may be applicable. The black box with parachute can thus be protected with importance being placed thereon. Consequently, flight data can be protected.

Alternatively, an aerial vehicle safety apparatus including a safety mechanism that ejects a black box (a flight recorder or the like) with a ring buoy together with a drive mechanism by using an ejection mechanism and expands the ring buoy of the black box with ring buoy in the event of crash of an aerial vehicle by using the drive mechanism may be applicable. The black box with ring buoy can thus be protected with importance being placed thereon. Consequently, flight data can be protected. The ring buoy here is attached to the outside of the black box as being shrunk or folded before activation of the drive mechanism, and it can be inflated and expanded at the time of activation of the drive mechanism.

When a gas generator is used for ejection of an ejected object (a safety mechanism or the like) by an ejection mechanism, an aerial vehicle safety apparatus including a safety mechanism capable of canceling rotary moment of a falling aerial vehicle based on measurement data from a sensor, calculating timing of stabilization of a position of the aerial vehicle by using a controller, and activating the gas generator at this timing by using a drive mechanism to eject the ejected object may be applicable. By thus canceling rotary moment of the falling aerial vehicle by using reaction of the gas pressure of the gas generator, the position of the aerial vehicle can be stabilized.

Various safety mechanisms described above may be incorporated in an aerial vehicle safety apparatus as being combined as appropriate. Though the drive mechanism described above can inflate or drive each component of the safety mechanism by using the features described above, limitation to the construction described above is not intended and any conventionally known driving technique is applicable to the present invention.

Summary of First to Third Embodiments, First to Fourth Modifications, and Other Modifications Described Above Characteristic features in the disclosure in the first to third embodiments and the first to fourth modifications described above and other modifications described above are summarized as below by paragraphs.

(1) A safety apparatus according to the present invention is attachable to an aerial vehicle including a propulsive mechanism, and the safety apparatus includes a safety mechanism used for securing safety of the aerial vehicle and an object outside the aerial vehicle, a drive mechanism including at least one drive unit serving as a drive source of the safety mechanism, and an ejection mechanism capable of ejecting the drive mechanism together with the safety mechanism, and the drive mechanism includes a delay mechanism that activates the drive unit after lapse of a prescribed time period since activation of the ejection mechanism.

According to the construction in (1), the ejection mechanism and the delay mechanism do not have to be controlled through a plurality of independent channels but can be controlled through a single channel. Therefore, a configuration of a control unit of an apparatus can be simplified. Consequently, a safety apparatus lighter in weight than in a conventional example can be provided.

(2) Preferably, the safety apparatus in (1) further includes a controller that controls the ejection mechanism and the delay mechanism, the ejection mechanism and the delay mechanism simultaneously receive an activation signal from the controller, and the delay mechanism activates the drive unit after lapse of a prescribed time period since reception of the activation signal.

According to the construction in (2), control for activating the drive unit after lapse of a prescribed time period since activation of the ejection mechanism can readily and accurately be carried out.

(3) In the safety apparatus in (1) or (2), preferably, the safety mechanism includes a parachute or a paraglider attached as being expandable to the aerial vehicle or a member provided in the aerial vehicle by a coupling member, the ejection mechanism is capable of ejecting the parachute or the paraglider, and the drive mechanism includes an expansion mechanism that is attached to the parachute or the paraglider and automatically expands the parachute or the paraglider.

According to the construction in (3), the mechanism for ejecting the parachute or the paraglider and the mechanism for expanding the parachute or the paraglider do not have to be controlled through a plurality of independent channels but can be controlled through a single channel Therefore, a configuration of a control unit of an apparatus can be simplified. Consequently, a safety apparatus lighter in weight than in a conventional example can be provided.

(4) In the safety apparatus in (3), preferably, the ejection mechanism includes a first ejector and a second ejector, the first ejector includes a mechanism that ejects the second ejector toward a prescribed position, and the second ejector ejects the parachute or the paraglider after the first ejector ejects the second ejector.

According to the construction in (4), in order to avoid interference by each component of the aerial vehicle, for example, the first ejector can eject the second ejector to a more advantageous position and the second ejector can eject and expand the parachute or the paraglider at that position. Therefore, in an example of attachment of the safety apparatus to the aerial vehicle, the parachute or the paraglider can be expanded so as not to be entangled with or caught by each component such as a propulsive mechanism of the aerial vehicle.

(5) From another point of view, in the safety apparatus in (3), the ejection mechanism may include a first ejector and a second ejector, the first ejector may include a mechanism that ejects a drogue chute that draws out the parachute or the paraglider, and the second ejector may eject the parachute or the paraglider after the first ejector ejects the drogue chute.

According to the construction in (5), by ejecting the drogue chute in advance, the parachute or the paraglider can quickly be drawn out to a prescribed position while the parachute or the paraglider is ejected, and thereafter the parachute or the paraglider can be expanded at that position.

Therefore, in an example of attachment of the safety apparatus to the aerial vehicle, the parachute or the paraglider can be expanded so as not to be entangled with or caught by each component such as a propulsive mechanism of the aerial vehicle.

(6) In the safety apparatus in (3) to (5), preferably, the ejection mechanism includes a container including an opening on a side of one end, a moving member that is provided in the container, includes a platform carrying the parachute or the paraglider on a side of the opening, and is movable along an inner wall of the container, and an ejection drive unit capable of ejecting the moving member in a direction toward the opening, the coupling member has one end coupled to the parachute or the paraglider and the other end coupled to the aerial vehicle or a member provided in the aerial vehicle, and the opening is provided at a position higher than the propulsive mechanism in a direction of height of the safety apparatus.

According to the construction in (6), in an example of attachment of the safety apparatus to the aerial vehicle, the parachute or the paraglider can be expanded so as not to be entangled with or caught by each component such as a propulsive mechanism of the aerial vehicle.

(7) In the safety apparatus in (1) to (6), preferably, the delay mechanism includes an explosive type timer apparatus that incorporates a delay charge in an igniter to adjust ignition timing, a mechanical timer apparatus that uses a motor and a plurality of gears to adjust timing, or an electrical timer apparatus including an IC timer.

According to the construction in (7), the parachute or the paraglider can accurately be expanded after lapse of a prescribed time period since ejection of the parachute or the paraglider.

(8) The safety apparatus in (3) includes a bag-shaped member that is provided inside or outside the parachute or the paraglider, wound or folded together with the parachute or the paraglider, inflatable like a tube from the wound or folded state, and capable of expanding the parachute or the paraglider in the wound or folded state when the bag-shaped member is inflated like the tube and a gas generator capable of causing gas generated at the time of activation to flow in the bag-shaped member to inflate the bag-shaped member.

(9) From another point of view, the safety apparatus in (3) includes a bag-shaped member that is provided inside or outside the parachute or the paraglider, wound or folded separately from the parachute or the paraglider, inflatable like a tube from the wound or folded state, and capable of expanding the parachute or the paraglider in the wound or folded state when the bag-shaped member is inflated like the tube and a gas generator capable of causing gas generated at the time of activation to flow in the bag-shaped member to inflate the bag-shaped member.

According to the construction in (8) or (9), a safety apparatus simplified in structure, capable of achieving a shorter time period for expansion of the parachute or the paraglider, and capable of expanding the parachute or the paraglider with an extremely smaller amount of gas than in a conventional example can be provided.

Many parachutes have a fabric in a shape of an umbrella, and the parachute is connected to an object to be protected through a cord and decelerates the object to be protected by using air resistance. Examples of the parachute include a parachute including a single chute, a parachute including a string of chutes identical in shape, and a parachute including a string of chutes different in shape. Examples of the parachute further include a parachute including a chute having a closed center and a parachute including a chute provided with a hole called a spill hole in the center. A parachute is selected as appropriate for mitigation of shock at the time of expansion of the parachute, a rate of descent, and resistance against influence by disturbance such as wind.

A paraglider is in a shape like a wing having an aspect ratio approximately not lower than one, and it has a steering cord called a brake cord connected to left and right ends of the wing. By pulling the brake cord, various stresses applied to a cross-section of the wing can be varied, and consequently, gliding, turning, and rapid deceleration can be done. Therefore, the paraglider can do gliding, turning, and deceleration which cannot be done by a parachute. A Rogallo paraglider is also available as a paraglider similar in feature. In order to maintain the wing shape by using ram air, a paraglider with an air intake is in the mainstream, however, there is a paraglider without an air intake. In order to fly in a stable manner, a paraglider with an air intake is more preferable. A paraglider capable of flying by forcibly obtaining propelling force by including a propelling apparatus such as a propeller may be applicable.

(10) In the safety apparatus in (8) or (9), the drive unit is preferably incorporated in the gas generator.

According to the construction in (10), since activation of the gas generator can appropriately be controlled, timing of expansion of the parachute or the paraglider can appropriately be controlled.

(11) In the safety apparatus in (10), the gas generator is preferably of an explosive type containing an igniter.

According to the construction in (11), gas can instantaneously be generated. If a gas canister type gas generator without using an explosive is employed, a sharp member such as a needle and a compressed spring are coupled to each other and the sharp member is driven off by using spring force to impinge the sharp member onto a sealing plate that seals the canister and to emit gas. Though a servo motor is normally used for releasing compressive force of the spring, a response speed of the servo motor is remarkably lower than a response speed of the explosive. Therefore, a gas canister type gas generator is significantly lower in speed of generation of gas than an explosive type gas generator. In order to constantly maintain compressive force of the spring, a locking member high in strength is required and cost and also a weight increase. Therefore, use of the gas generator of an explosive type including an igniter can achieve reduction in size and weight of a safety apparatus as compared with a gas canister type gas generator without using an explosive.

In the safety apparatus in (10), the delay mechanism preferably includes an ignition delay mechanism that delays ignition of the igniter for a prescribed time period. Delay in ignition here means emission of gas from the gas generator and expansion of the parachute or the paraglider at timing later than timing of ejection of the parachute or the paraglider.

According to the ignition delay mechanism, the parachute or the paraglider can be expanded after ejection of the parachute or the paraglider. When the parachute or the paraglider is ejected and simultaneously expanded, expansion of the parachute or the paraglider starts within the ejection apparatus and may interfere ejection. When the parachute or the paraglider is ejected and simultaneously expanded, the parachute or the paraglider may be entangled with a propulsive apparatus of the aerial vehicle to which the present expansion apparatus is attached or with another component. Therefore, time of delay by the ignition delay mechanism (a time period from ejection of the parachute or the paraglider until expansion thereof) is preferably set as appropriate such that gas is not emitted from the gas generator until ejection of the parachute or the paraglider from the ejection apparatus is completed and the parachute or the paraglider is distant to such an extent as not interfering with the propulsive apparatus provided in the aerial vehicle or another component.

(12) in the safety apparatus in (11), preferably, the igniter contains an ignited agent and ignition means capable of generating flame energy for igniting the ignited agent, and the ignition delay mechanism includes a delay charge that is provided between the ignited agent and the ignition means and transmits flame energy of the ignition means to the ignited agent with a time lag. The delay charge is composed, for example, of a composition serving to hold flame energy converted in the igniter from electric energy input to the igniter and transmit flame energy to the ignited agent with a time lag. Normally, the delay charge is composed of at least one oxidizer selected from the group consisting of oxides and peroxides and at least one reducing agent selected from among simple substances of metal, metal nitrides, metal silicon compounds, metal fluorine compounds, metal sulfides, and metal phosphorus compounds.

(13) From another point of view, in the safety apparatus in (11), the ignition delay mechanism may include an electric circuit including a power supply and a switch of the power supply and a switch controller that controls the switch.

(14) From another point of view, in the safety apparatus in (11), the ignition delay mechanism may include a power supply, a positive electrode plate, a negative electrode plate opposed to the positive electrode plate, and an insulator removably interposed between the positive electrode plate and the negative electrode plate, and include a switch capable of switching the power supply from off to on and a switch coupling member having one end coupled to the insulator and the other end coupled to a main body of the ejection mechanism or to a prescribed portion to which the safety mechanism is fixed. The safety mechanism may switch the power supply from off to on when the parachute or the paraglider is ejected, in such a manner that the insulator is pulled by the switch coupling member and removed from between the positive electrode plate and the negative electrode plate to allow the positive electrode plate and the negative electrode plate to come in contact with each other.

According to the construction in (12) to (14), timing of expansion of the parachute or the paraglider can appropriately and accurately be controlled. Without such a feature, in order to activate the safety mechanism at timing delayed relatively to the ejection mechanism, a lead wire necessary for transmitting an activation signal even during ejection should be held on a side of the parachute or the paraglider, which leads to a concern about increase in weight of a component or break of a lead wire. Furthermore, units for controlling the ejection mechanism and the safety mechanism are required, which leads to complication and increase in weight.

(15) In the safety apparatus in (14), a length of the switch coupling member is preferably adjustable in the ignition delay mechanism.

According to the construction in (14), timing of conduction of a current to the igniter in the gas generator can be adjusted as appropriate.

(16) In the safety apparatus in (8) to (15), the bag-shaped member preferably includes a plurality of tubular portions formed radially or in grids.

According to the construction in (16), the plurality of tubular members provided over a wide area of the parachute or the paraglider can be inflated by gas generated by a single gas generator or a plurality of gas generators. Therefore, the wound or folded parachute or paraglider can more readily be expanded. When there are a plurality of gas generators, a structure is complicated and weight and cost increase. Therefore, a single gas generator is more preferably provided.

(17) In the safety apparatus in (8) to (15), the bag-shaped member may be provided along a longitudinal direction of the expanded paraglider.

According to the construction in (17), the paraglider in a compactly wound or folded state can more efficiently be expanded.

(18) In the safety apparatus in (8) to (17), preferably, the paraglider includes a wing-shaped member containing a plurality of air chambers and a plurality of air inlets provided in a front portion so as to correspond to respective ones of the air chambers, and in the inside or the outside of the wing-shaped member, the bag-shaped member is provided to extend along the plurality of air inlets of the expanded paraglider, in the vicinity of the plurality of air inlets.

According to the construction in (18), when the bag-shaped member provided in the wing-shaped member is inflated, the wing-shaped member of the wound or folded paraglider can forcibly and instantaneously be expanded and hence a negative pressure is developed in the inside of the wing-shaped member. Since air can thus be forced to flow into the wing-shaped member through the plurality of air inlets, the wing-shaped member of the paraglider can quickly be expanded.

(19) From another point of view, in the safety apparatus in (1) or (2), the safety mechanism may include an air bag attached in an expandable manner to the aerial vehicle or a member provided in the aerial vehicle, and the drive mechanism may include an expansion mechanism that is attached to the air bag and automatically expands the air bag.

According to the construction in (19), a mechanism for ejecting the air bag and a mechanism for expanding the air bag do not have to be controlled through a plurality of independent channels but can be controlled through a single channel. Therefore, a configuration of a control unit of an apparatus can be simplified. Consequently, a safety apparatus lighter in weight than in a conventional example can be provided.

(20) The safety apparatus in (19) preferably includes a bag-shaped member that is provided inside or outside the air bag, wound or folded together with the air bag, inflatable like a tube from the wound or folded state, and capable of expanding the wound or folded air bag when it is inflated like the tube and a gas generator capable of inflating the bag-shaped member by causing generated gas to flow into the bag-shaped member at the time of activation.

(21) From another point of view, the safety apparatus in (19) includes a bag-shaped member that is provided inside or outside the air bag, wound or folded separately from the air bag, inflatable like a tube from the wound or folded state, and capable of expanding the wound or folded air hag when it is inflated like the tube and a gas generator capable of inflating the bag-shaped member by causing generated gas to flow into the bag-shaped member at the time of activation.

As gas flows into the wound or folded bag-shaped member described above, the bag-shaped member is readily inflated and formed like a tube (like a pipe or a cylinder) including an internal space. Thus, according to the construction in (20) or (21), a structure can be simplified, a time period for expanding the air bag can be shorter, and an extremely smaller amount of gas than in a conventional example can expand the air bag.

(22) An aerial vehicle according to the present invention includes an airframe, the safety apparatus in (1) to (18) and/or the safety apparatus in (19) to (21) coupled to the airframe, and one propulsive mechanism or a plurality of propulsive mechanisms that is/are coupled to the airframe and propel(s) the airframe.

According to the construction in (22), since an aerial vehicle includes at least the safety apparatus in (1) or (2), the aerial vehicle relatively simplified in structure, lighter in weight than an aerial vehicle including a conventional safety apparatus, and capable of protecting the aerial vehicle itself and an object against which the aerial vehicle collides can be provided. In particular, when the safety apparatus in (3) to (18) is provided, a safer aerial vehicle simplified in structure capable of achieving a shorter time period for expansion of a parachute or a paraglider and expanding the parachute or the paraglider with an extremely smaller amount of gas than in a conventional example can be provided. When the safety apparatus in (19) to (21) is provided, as described above, a safer aerial vehicle simplified in structure capable of achieving a shorter time period for expansion of an air bag and expanding the air bag with an extremely smaller amount of gas than in a conventional example can be provided.

The embodiments and the modifications thereof disclosed herein are illustrative and non-restrictive in every respect. The technical scope of the present invention is delimited by the terms of the claims and includes any modifications within the scope and meaning equivalent to the terms of the claims.

REFERENCE SIGNS LIST 10 paraglider; 30 aerial vehicle; 31 airframe; 32 propulsive mechanism; 33 leg; 40 canopy; 41 upper cloth; 42 lower cloth; 43 rib; 44 cell; 45 to 48 inner air flow hole; 49 air intake; 50 bag-shaped member; 51 one end; 60 gas generator; 61 power supply; 62 switch; 62a insulator; 70 side cloth; 80 line; 81 piston; 82 recess; 83 piston head; 84 igniter; 85 case; 86 housing; 87 lid; 88 actuator; 100 aerial vehicle safety apparatus; 110 parachute; 130 aerial vehicle; 131 airframe; 132 propulsive mechanism; 133 leg; 140 chute; 140a inner surface; 150 bag-shaped member; 160 gas generator; 180 line; 186 housing; 200 aerial vehicle safety apparatus; 230 aerial vehicle; 231 airframe; 232 propulsive mechanism; 233 leg; 250 bag-shaped member; 260 gas generator; 300 aerial vehicle safety apparatus; 310 air bag apparatus; 311 air bag; 313 sensor; 320 controller; 321 sensor abnormality sensing unit; 322 calculator; 323 notification unit; 330 aerial vehicle; 331 airframe; 332 propulsive mechanism; 333 leg; 340 abnormality detection apparatus; 340 lead wire; 351 coupling member; 370 first ejector; 371 piston; 372 recess; 373 piston head; 374 gas generator; 375 case; 376 housing; 377 lid; 378 actuator; 380 housing; 381 piston; 382 recess; 383 piston head; 384 gas generator; 385 case; 386 paraglider; 386a bag-shaped member; 386b gas generator; 386c delay apparatus; 387 lid; 388 actuator; 390 second ejector; 400 aerial vehicle safety apparatus; 430 aerial vehicle; 431 airframe; 432 propulsive mechanism; 433 leg; 451 coupling member; 460 drogue chute ejector; 461 drogue chute; 462 string member; 480 container; 481 piston; 482 recess; 483 piston head; 484 gas generator; 485 case; 486 paraglider; 486a bag-shaped member; 487 lid; 488 actuator; 500 aerial vehicle safety apparatus; 610 air bag apparatus; 611 air bag; 630 aerial vehicle; 631 airframe; 632 propulsive mechanism; 633 leg; 690 aerial vehicle safety apparatus; 710 air bag apparatus; 711 air bag; 730 aerial vehicle; 731 airframe; 732 propulsive mechanism; 733 leg; 790 aerial vehicle safety apparatus; 1000 igniter; 1010 plug; 1020 terminal pin; 1030 holder; 1040 cup-shaped member; 1060 delay charge; 1070 ignited agent; 2000 igniter; 2010 plug; 2020 terminal pin; 2030 holder; 2040 cup-shaped member; 2050 first ignited agent; 2060 delay charge; 2070 second ignited agent

The invention claimed is:

1. An aerial vehicle safety apparatus attachable to an aerial vehicle including a propulsive mechanism, the aerial vehicle safety apparatus comprising:
    a safety mechanism used for securing safety of at least one of the aerial vehicle and an object outside the aerial vehicle;
    a drive mechanism including at least one drive unit serving as a drive source of the safety mechanism;
    an ejection mechanism capable of ejecting the drive mechanism together with the safety mechanism; and
    a control mechanism that controls operations of the drive mechanism for the drive mechanism to drive the safety mechanism after the ejection mechanism starts ejection of the safety mechanism.

2. The aerial vehicle safety apparatus according to claim 1, wherein
    the ejection mechanism and the control mechanism simultaneously receive an activation signal,
    the drive unit includes an explosive type gas generator containing an igniter,
    the igniter includes a combustion agent that burns by being ignited, an ignited portion that generates thermal energy that ignites the combustion agent, and a delay charge interposed between the combustion agent and the ignited portion, the delay charge conducting, with a time lag, thermal energy generated by the ignited portion to the combustion agent, and
    the control mechanism includes the delay charge.

3. The aerial vehicle safety apparatus according to claim 1, wherein
    the ejection mechanism and the control mechanism simultaneously receive an activation signal, and
    the control mechanism includes an activation delay mechanism that activates the drive mechanism after lapse of a prescribed time period since activation of the ejection mechanism.

4. The aerial vehicle safety apparatus according to claim 3, wherein
    the activation delay mechanism includes a mechanical timer apparatus that delays timing of activation of the drive unit by using a motor and a plurality of gears or an electric timer apparatus that delays timing of activation of the drive unit by using an IC timer.

5. The aerial vehicle safety apparatus according to claim 1, wherein
    the safety mechanism includes an expandable object that is wound or folded in a non-expanded state, the expandable object being capable of generating at least one of lift and buoyancy in an expanded state,
    the ejection mechanism includes an ejection apparatus coupled to the expandable object with a coupling member being interposed, the ejection apparatus being configured to eject the non-expanded expandable object into air, and the drive mechanism includes an expansion mechanism provided in the expandable object, the expansion mechanism being configured to expand the expandable object.

6. The aerial vehicle safety apparatus according to claim 5, wherein
the ejection apparatus includes a first ejector and a second ejector,
the first ejector ejects the expandable object and the second ejector into air, and
the second ejector ejects the expandable object into air after the second ejector is ejected by the first ejector.

7. The aerial vehicle safety apparatus according to claim 6, wherein
the expansion mechanism includes a bag-shaped member provided in the expandable object and a gas generator as the drive unit provided in the expandable object,
the bag-shaped member includes a member that is wound or folded together with or separately from the non-expanded expandable object and expands the non-expanded expandable object when the bag-shaped member is at least partially inflated to a tube-like shape, and
the gas generator inflates the bag-shaped member by causing gas generated at time of activation to flow into the hag-shaped member.

8. The aerial vehicle safety apparatus according to claim 7, wherein
the expandable object includes a wing-shaped member containing a plurality of air chambers and a plurality of air inlets provided in a front portion so as to correspond to respective ones of the plurality of air chambers, and
the bag-shaped member is disposed inside or outside the expandable object as extending along of a portion of the expandable object where the plurality of air inlets are provided.

9. The aerial vehicle safety apparatus according to claim 7, wherein
the gas generator is of an explosive type containing an igniter,
the igniter includes a combustion agent that burns by being ignited, an ignited portion that generates thermal energy that ignites the combustion agent, and a delay charge interposed between the combustion agent and the ignited portion, the delay charge conducting, with a time lag, thermal energy generated by the ignited portion to the combustion agent, and
the control mechanism includes the delay charge.

10. The aerial vehicle safety apparatus according to claim 9, wherein
the gas generator is of an explosive type containing an igniter, and
the control mechanism includes an activation delay mechanism that activates the gas generator after lapse of a prescribed time period since activation of the ejection apparatus.

11. The aerial vehicle safety apparatus according to claim 10, further comprising an electric circuit that supplies electric power for activating the gas generator, wherein
the electric circuit includes a power supply and a switch that switches on and off the power supply, and
the activation delay mechanism includes the electric circuit and a switch controller that switches operations of the switch.

12. The aerial vehicle safety apparatus according to claim 1, wherein
the safety mechanism includes an air bag as an expandable object, the air bag being wound or folded in a non-expanded state and serving as a cushion in an expanded state,
the ejection mechanism includes an ejection apparatus coupled to the air bag with a coupling member being interposed, the ejection apparatus being configured to eject the non-expanded air bag into air,
the drive mechanism includes an expansion mechanism provided in the air bag, the expansion mechanism being configured to expand the air bag,
the expansion mechanism includes a bag-shaped member provided in the air bag and a gas generator as the drive unit provided in the air bag,
the bag-shaped member includes a member that is wound or folded together with or separately from the non-expanded air bag and expands the non-expanded air bag when the bag-shaped member is at least partially inflated to a tube-like shape, and
the gas generator inflates the bag-shaped member by causing gas generated at time of activation to flow into the bag-shaped member.

13. An aerial vehicle comprising:
an airframe;
a propulsive mechanism provided in the airframe, the propulsive mechanism propelling the airframe; and
the aerial vehicle safety apparatus according to claim 1, the aerial vehicle safety apparatus being attached to the airframe.

14. An aerial vehicle comprising:
an airframe;
a propulsive mechanism provided in the airframe, the propulsive mechanism propelling the airframe; and
the aerial vehicle safety apparatus according to claim 6, the aerial vehicle safety apparatus being attached to the airframe.

15. An aerial vehicle comprising:
an airframe;
a propulsive mechanism provided in the airframe, the propulsive mechanism propelling the airframe; and
the aerial vehicle safety apparatus according to claim 12, the aerial vehicle safety apparatus being attached to the airframe.

* * * * *